United States Patent
Fukunaga et al.

(10) Patent No.: US 6,775,020 B2
(45) Date of Patent: *Aug. 10, 2004

(54) INFORMATION PROCESSING APPARATUS AND METHOD OF PROCESSING INFORMATION

(75) Inventors: Koji Fukunaga, Tokyo (JP); Jiro Tateyama, Yokohama (JP); Atsushi Nakamura, Kawasaki (JP); Makoto Kobayashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,976

(22) Filed: Feb. 12, 1998

(65) Prior Publication Data

US 2001/0012118 A1 Aug. 9, 2001

(30) Foreign Application Priority Data

Feb. 14, 1997 (JP) .............................................. 9-030538

(51) Int. Cl.[7] .............................. G06F 3/12; G06F 13/00
(52) U.S. Cl. ....................................... 358/1.15; 358/1.14
(58) Field of Search .................................. 395/114, 111, 395/115; 358/1.15, 1.11, 1.14, 878, 309, 280, 293; 709/201, 220, 223, 224, 228, 229, 319; 710/7, 4, 5, 8, 31, 33, 46

(56) References Cited

U.S. PATENT DOCUMENTS 5,815,678 A  * 9/1998 Hoffman et al. ............ 395/309
5,915,127 A  * 6/1999 Ogawa et al. ............... 395/878
6,469,796 B1 * 10/2002 Leiman et al. ............. 358/1.15

* cited by examiner

Primary Examiner—Gabriel Garcia
Assistant Examiner—Douglas Tran
(74) Attorney, Agent, or Firm—Fitzpatrick, Cella, Harper & Scinto

(57) ABSTRACT

Disclosed is an information processing apparatus connected to a printer through an interface such as IEEE1394 capable of changing a transmission bandwidth. In order to perform a transmission at an optimum transmission speed when image data is transmitted by an isochronous transmission, the apparatus comprises means for recognizing a printer performance and bandwidth setting means for setting the transmission bandwidth in accordance with the recognized performance, wherein the transmission bandwidth is set so that it may be suitable for the printer performance, whereby the data can be transmitted.

40 Claims, 40 Drawing Sheets

FIG. 11

CSR CORE REGISTER

| OFFSET (HEXADECIMAL) | REGISTER NAME | FUNCTION |
|---|---|---|
| 000 | STATE CLEAR | INFORMATION FOR STATE AND CONTROL |
| 004 | STATE SET | INFORMATION INDICATING WHETHER OR NOT "STATE CLEAR" CAN BE WRITTEN |
| 008 | NODE IDS | BUS ID+NODE ID |
| 00C | RESET START | RESET BUS UPON WRITING TO THIS AREA |
| 010 TO 014 | INDIRECT ADDRESS, INDIRECT DATA | REGISTER TO ACCESS ROM>1K |
| 018 TO 01C | SPLIT TIMEOUT | TIMER TO DETECT SPLIT TRANSACTION TIMEOUT |
| 020 TO 02C | ARGUMENT, TEST START, TEST STATUS | REGISTER TO TEST |
| 030 TO 04C | UNITS BASE, UNITS BOUND, MEMORY BASE, MEMORY BOUND | NOT AVAILABLE FOR IEEE 1394 |
| 050 TO 054 | INTERRUPT TARGET, INTERRUPT MASK | REGISTER TO INFORM INTERRUPTION |
| 058 TO 07C | CLOCK VALUE, CLOCK TICK PERIOD, CLOCK STROBE ARRIVED, CLOCK INFO | NOT AVAILABLE FOR IEEE 1394 |
| 080 TO 0FC | MESSAGE REQUEST, MESSAGE RESPONSE | REGISTER TO INFORM MESSAGE |
| 100 TO 17C |  | RESERVED |
| 180 TO 1FC | ERROR LOG BUFFER | RESERVED FOR IEEE 1394 |

FIG. 12

SERIAL BUS REGISTER

| OFFSET (HEXADECIMAL) | REGISTER NAME | FUNCTION |
|---|---|---|
| 200 | CYCLE TIME | COUNTER FOR ISOCHRONOUS TRANSMISSION |
| 204 | BUS TIME | REGISTER TO SYNCHRONIZE TIME |
| 208 | POWER FAIL IMMINENT | REGISTER FOR POWER SUPPLY |
| 20C | POWER SOURCE | |
| 210 | BUSY TIMEOUT | CONTROL RE-TRIAL OF TRANSACTION LAYER |
| 214 TO 218 | | RESERVED |
| 21C | BUS MANAGER ID | NODE ID FOR BUS MANAGER |
| 220 | BANDWIDTH AVAILABLE | MANAGE ISOCHRONOUS TRANSMISSION BANDWIDTH |
| 224 TO 228 | CHANNELS AVAILABLE | MANAGE ISOCHRONOUS TRANSMISSION CHANNEL NO. |
| 22C | MAINT CONTROL | REGISTER TO TEST |
| 230 | MAINT UTILITY | |
| 234 TO 3FC | | RESERVED |

FIG. 13

SERIAL BUS DEVICE REGISTER

| OFFSET (HEXADECIMAL) | REGISTER NAME | FUNCTION |
|---|---|---|
| 800 TO FFC | | RESERVED |
| 1000 TO 13FC | TOPOLOGY MAP | INFORMATION ON SERIAL BUS STRUCTURE |
| 1400 TO 1FFC | | RESERVED |
| 2000 TO 2FFC | SPEED MAP | INFORMATION ON SERIAL BUS TRANSMISSION SPEED |
| 3000 TO FFFC | | RESERVED |

FIG. 14

| 01 | VENDER ID |
|---|---|

FIG. 15

| "BUS INFO BLOCK" LENGTH | ROM LENGTH | CRC |
|---|---|---|
| BUS INFO BLOCK (1394 ASCII CODE AND INFORMATION INDICATING WHETHER NODE HAS ISOCHRONOUS RESOURCE MANAGEMENT, CYCLE MASTER OR BUS MANAGER ABILITY) ||| 
| ROOT DIRECTORY (INFORMATION INDICATING VENDER ID AND NODE FUNCTION) |||
| UNIT DIRECTORIES (UNIT TYPE AND DRIVER SOFT VERSION) |||
| ROOT & UNIT LEAVES |||
| VENDER DEPENDENT INFORMATION |||

FIG. 22

| DESTINATION ID | | TL | RT | TCODE | PRI |
|---|---|---|---|---|---|
| SOURCE ID | | | | | |
| DESTINATION OFFSET | | | | | |
| DATA LENGTH | | EXTENDED TCODE | | | |
| HEADER CRC | | | | | |
| DATA FIELD | | | | | |
| | PAD FIELD | | | | |
| DATA CRC | | | | | |

FIG. 24

| DATA LENGTH | TAG | CHANNEL | TCODE | SY |
|---|---|---|---|---|
| HEADER CRC | | | | |
| DATA FIELD | | | | |
| | PAD FIELD | | | |
| DATA CRC | | | | |

FIG. 25

| ABBR. | NAME | CONTENTS |
|---|---|---|
| DESTINATION ID | DESTINATION IDENTIFIER | DESTINATION NODE ID (ASYNCHRONOUS ONLY) |
| TL | TRANSACTION LABEL | LABEL INDICATING A SERIES OF TRANSACTIONS (ASYNCHRONOUS ONLY) |
| RT | RETRY CODE | CODE INDICATING RETRY STATUS (ASYNCHRONOUS ONLY) |
| TCODE | TRANSACTION CODE | CODE INDICATING PACKET TYPE (ASYNCHRONOUS ONLY) |
| PRI | PRIORITY | PRIORITY (ASYNCHRONOUS ONLY) |
| SOURCE ID | SOURCE IDENTIFIER | SOURCE ID NODE (ASYNCHRONOUS ONLY) |
| DESTINATION OFFSET | DESTINATION MEMORY ADDRESS | DESTINATION NODE MEM ADDRESS (ASYNCHRONOUS ONLY) |
| RCODE | RESPONSE CODE | RESPONSE STATUS (ASYNCHRONOUS ONLY) |
| QUADLET DATA | QUADLET (4 BYTES) DATA | 4-BYTE LENGTH (ASYNCHRONOUS ONLY) |
| DATA LENGTH | LENGTH OF DATA | DATA FIELD LENGTH (EXCEPT FOR PAD BYTES) |
| EXTENDED TCODE | EXTENDED TRANSACTION CODE | EXTENDED TRANSACTION CODE (ASYNCHRONOUS ONLY) |
| CHANNEL | ISOCHRONOUS IDENTIFIER | IDENTIFY ISOCHRONOUS PACKET |
| SY | SYNCHRONIZATION CODE | FOR SYNCHRONIZING IMAGE & AUDIO (ASYNCHRONOUS ONLY) |
| CYCLE TIME DATA | CONTENTS OF THE CYCLE TIME REGISTER | CYCLE TIMER REGISTER OF CYCLE MASTER NODE (CYCLE PACKET ONLY) |
| DATA FIELD | DATA+PAD BYTES | FOR STORING DATA (ISOCHRONOUS AND ASYNCHRONOUS) |
| HEADER CRC | CRC FOR HEADER FIELD | CRC FOR HEADER FIELD |
| DATA CRC | CRC FOR DATA FIELD | CRC FOR DATA FIELD |
| TAG | TAG LABEL | ISOCHRONOUS PACKET FORMAT |

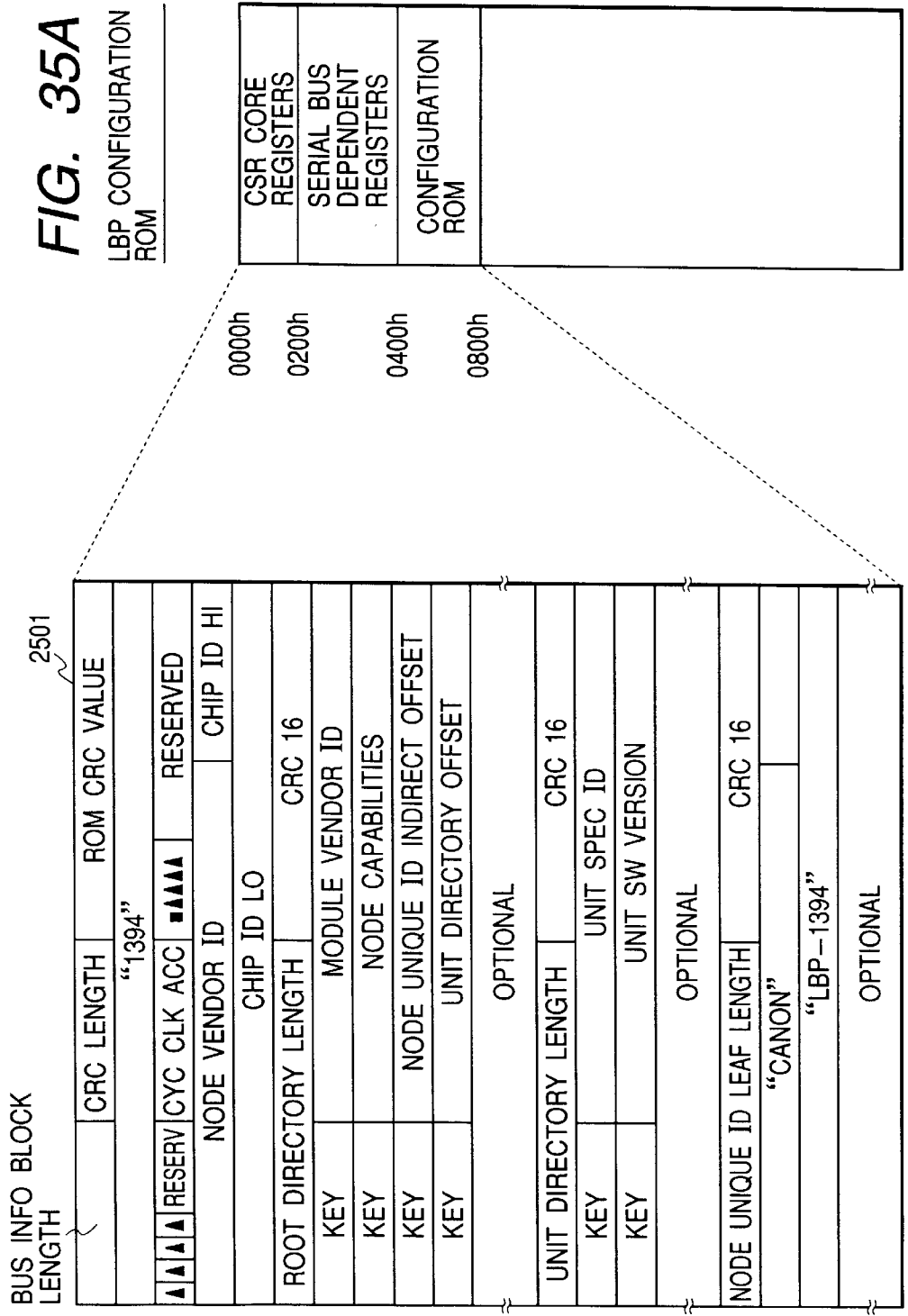

LBP REGISTER SPACE

INK JET PRINTER REGISTER SPACE

INFORMATION PROCESSING APPARATUS AND METHOD OF PROCESSING INFORMATION

BACKGROUND OF THE INVENTION

1. Field of the Invention

The present invention relates to an information processing apparatus connected to a printer through an interface such as IEEE1394.

2. Related Background Art

Heretofore, a host (personal computer) and a printer have been connected to each other through an interface (Centronics interface or the like) by one-to-one correspondence. Print data and a print instruction transmitted from the host are sequentially processed by the printer so as to thereby perform a print. The print data and the print instruction are generated by a printer driver by means of a control code inherent in the printer. They are then transmitted to the printer.

The printer analyzes the control code transmitted from the host. If the control code indicates the print data, the printer stores the print data as much as printable. Some control codes of the print data take a raster form. The stored print data is image-processed and converted. Image data is restructured in such a form that it can be printed by a print head and a drum mounted in the printer. The image data is transmitted to the print head and the drum whereby the print is performed. The control code is used so as to thereby perform a processing for various control codes such as a paper feed/discharge and a feed.

However, through the prior-art interface (Centronics interface or the like), the host and the printer are connected to each other by one-to-one correspondence. Such an interface is used only for a transmission of the print data to the printer and an obtainment of information from the printer. Through the interface such as IEEE1394, apparatuses other than the conventional host and printer, for example, a digital video camera (DV), a digital camera (DC), a scanner and the like are connected to one another. A plurality of hosts and a plurality of printers can be also connected to one another. On the IEEE1394 interface, the data is transmitted to/received from a plurality of apparatuses. Therefore, the interface is not used exclusively for the host and the printer. A data transmission bandwidth is shared with a plurality of apparatuses. It is thus necessary to distribute the data transmission bandwidth among the apparatuses in an optimum manner and to effectively use the data transmission bandwidth.

SUMMARY OF THE INVENTION

It is an object of the present invention to provide an apparatus and a method for processing information in which a printer performance is recognized, a host determines a data transmission bandwidth suitable for the printer performance and the optimum transmission bandwidth is used so as to thereby perform a transmission of print data.

In order to solve the above problem, an information processing apparatus of the present invention comprises: recognizing means for recognizing a performance of a printing apparatus; setting means for setting an isochronous packet transmission bandwidth in accordance with the performance of the printing apparatus recognized by the recognizing means; and transmitting means for transmitting print data to the printing apparatus by the use of the isochronous packet transmission bandwidth set by the setting means.

Furthermore, the information processing apparatus of the present invention comprises: recognizing means for recognizing a type of print data; setting means for setting an isochronous packet transmission bandwidth in accordance with the type of print data recognized by the recognizing means; and transmitting means for transmitting the print data to the printing apparatus by the use of the isochronous packet transmission bandwidth set by the setting means.

Furthermore, the information processing apparatus of the present invention comprises: recognizing means for recognizing a print mode; setting means for setting an isochronous packet transmission bandwidth in accordance with the print mode recognized by the recognizing means; and transmitting means for transmitting the print data to the printing apparatus by the use of the isochronous packet transmission bandwidth set by the setting means.

A method of processing information according to the present invention comprises the steps of: recognizing a performance of a printing apparatus; setting an isochronous packet transmission bandwidth in accordance with the performance of the printing apparatus recognized by the recognizing step; and transmitting print data to the printing apparatus by the use of the isochronous packet transmission bandwidth set by the setting step.

Furthermore, the information processing method of the present invention comprises the steps of: recognizing a type of print data; setting an isochronous packet transmission bandwidth in accordance with the type of print data recognized by the recognizing step; and transmitting the print data to the printing apparatus by the use of the isochronous packet transmission bandwidth set by the setting step.

Furthermore, the information processing method of the present invention comprises the steps of: recognizing a print mode; setting an isochronous packet transmission bandwidth in accordance with the print mode recognized by the recognizing step; and transmitting the print data to the printing apparatus by the use of the isochronous packet transmission bandwidth set by the setting step.

BRIEF DESCRIPTION OF THE DRAWINGS

FIG. 11 shows a CSR architecture function according to the present invention;

FIG. 12 shows a resister associated with the serial bus according to the present invention;

FIG. 13 shows the resister associated with a node resource of the serial bus according to the present invention;

FIG. 14 shows a minimum form of a configuration ROM of the serial bus according to the present invention;

FIG. 15 shows a general form of the configuration ROM of the serial bus according to the present invention;

FIG. 22 shows a packet format of the asynchronous transmission according to the present invention;

FIG. 24 shows the packet format of the isochronous transmission according to the present invention;

FIG. 25 shows a detail of a field of the packet format of the isochronous transmission according to the present invention;

FIGS. 35A and 35B show a structure of data stored in the configuration ROM according to the present invention;

DETAILED DESCRIPTION OF THE PREFERRED EMBODIMENTS

Figure 1:
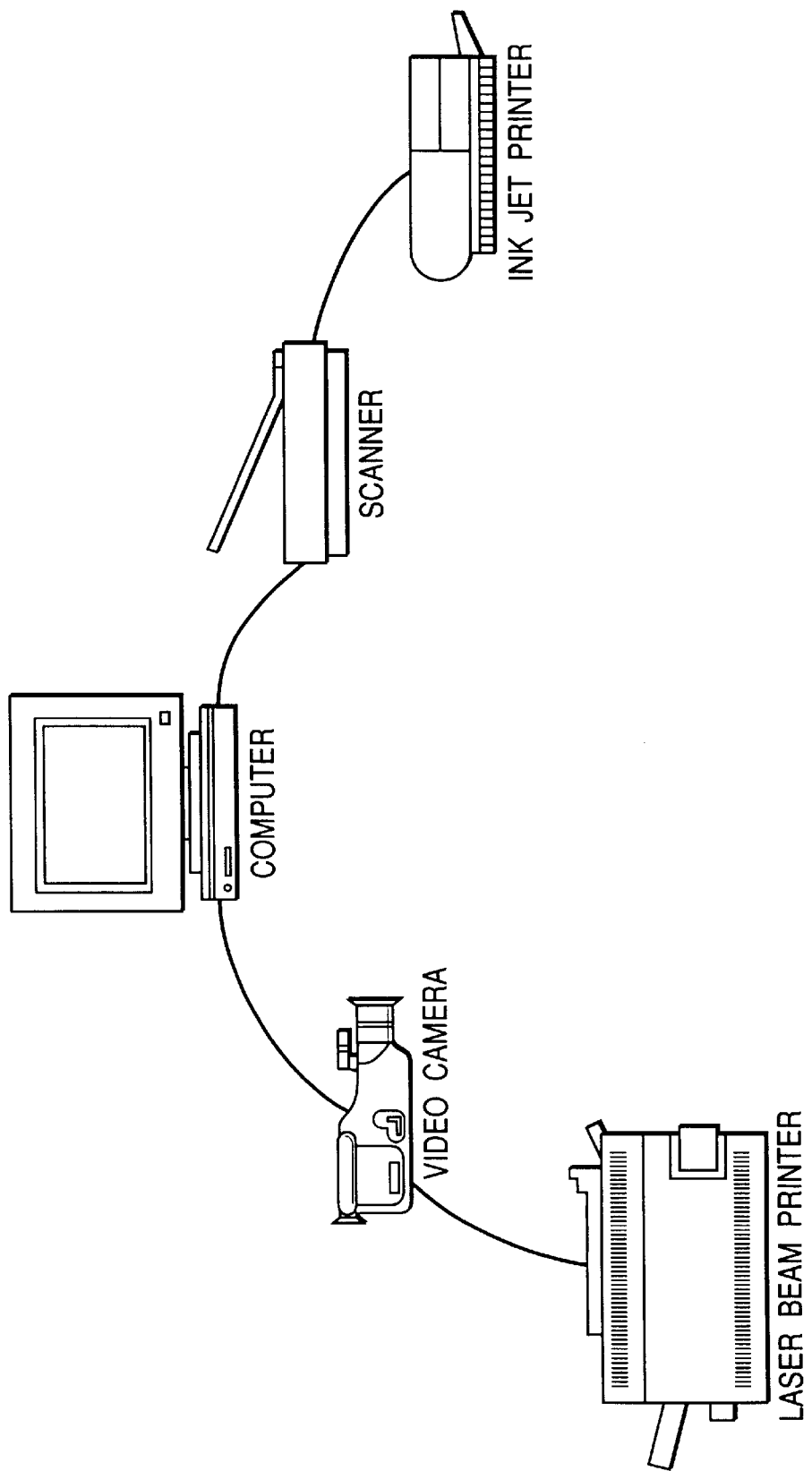
FIG. 1 shows an apparatus connection configuration according to the present invention.

FIG. 1 shows an example of a 1394 network. Each node comprises a video camera, a laser beam printer, a scanner, an ink jet printer or the like so that a workstation may be centered. The nodes are connected to one another by a 1394 serial bus cable.

In case of this example, it is assumed that data is input/output from the workstation to the printer, from the scanner to the workstation, from the scanner to the printer, from the video camera to the workstation, from the video camera to the printer or the like.

[Summary of IEEE1394 technique]

Due to an appearance of a household digital VTR and DVD, it is necessary to support a data transmission of video data, audio data or the like so that a large amount of information may be transmitted at real time. Such video data and audio data are transmitted at real time. In order that the data is captured in a personal computer (PC) or the data is transmitted to other digital apparatus, an interface having a necessary transmission function and capable of a high-speed data transmission is required. The interface developed in this point of view is IEEE1394-1995 (High Performance Serial Bus) (hereinafter referred to as 1394 serial bus).

Figure 2:
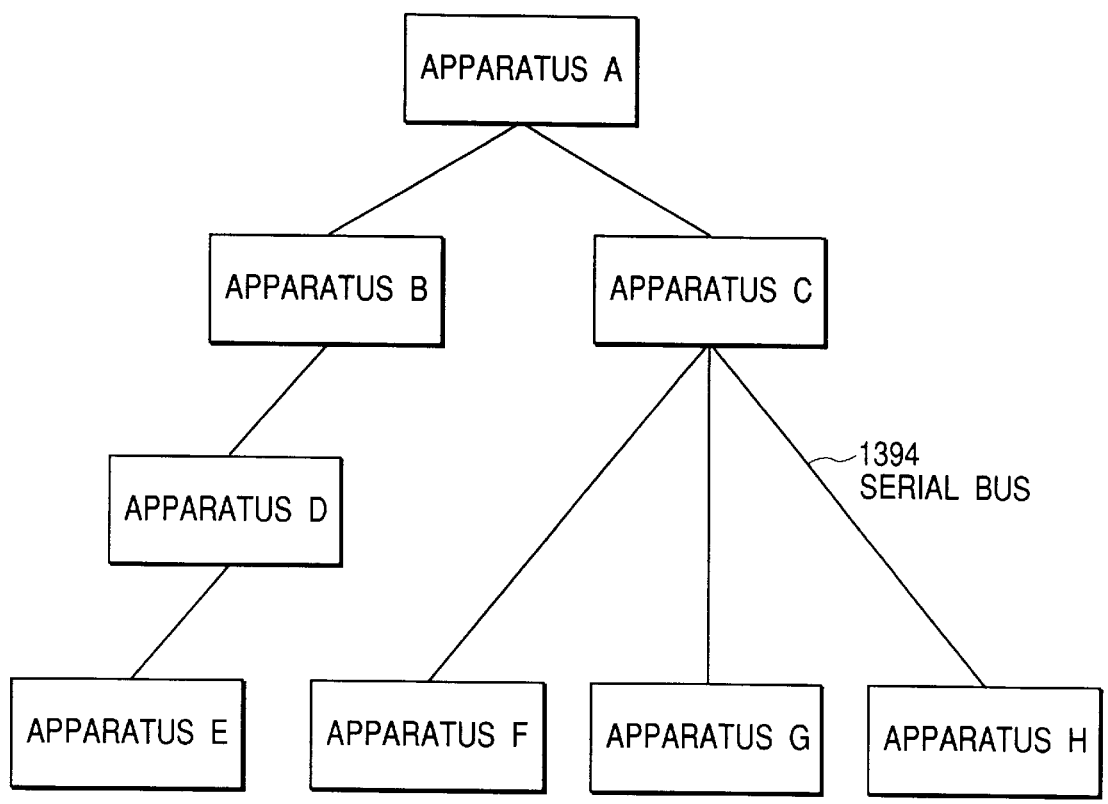
FIG. 2 shows a network configuration according to the present invention.

FIG. 2 shows the example of a network system configured by the use of the 1394 serial bus. This system comprises apparatuses A, B, C, D, E, F, G and H. The apparatuses A and B, A and C, B and D, D and E, C and F, C and G, C and H are connected to each other through a twisted-pair cable of the 1394 serial bus. The apparatuses A through H are, for example, the PC, the digital VTR, the DVD, a digital camera, a hard disk, a monitor or the like.

The system of connecting the apparatuses is configured so that a daisy chain system and a node branch system can be mixed. This system can accomplish a highly free connection.

Each apparatus has an inherent ID. The apparatuses recognize the respective Id's, whereby a single network is configured within a range in which the apparatuses are connected to one another through the 1394 serial bus. The sequential connection alone of the digital apparatuses through a single 1394 serial bus cable allows the apparatuses to serve as a relay. As a whole, a single network is configured. This system also has the following function. That is, when the cable is connected to the apparatus, the apparatus, a connection condition or the like is automatically recognized by means of a Plug and Play function which is a feature of the 1394 serial bus.

In the system shown in FIG. 2, when a certain apparatus is eliminated from the network or a new apparatus is added to the network, a bus reset is automatically performed. A previous network configuration is reset. A new network is then reconstructed. By this function, the network configuration can be set and recognized at all times.

A data transmission speed is 100/200/400 Mbps. The apparatus having the higher transmission speed supports the apparatus having the lower transmission speed so that the apparatuses may be compatible with each other.

A data transmission mode includes an asynchronous transmission mode for transmitting asynchronous data (hereinafter referred to as Async data) such as a control signal and an isochronous transmission mode for transmitting isochronous data (hereinafter referred to as Iso data) such as the real-time video data and audio data. In each cycle (typically, 125 μS/cycle), the Async data and the Iso data follow the transmission of a cycle start packet (CSP) indicating a cycle start. The Async data and the Iso data are mixed in the cycle and transmitted so that the transmission of the Iso data may have priority over that of the Async data.

Figure 3:
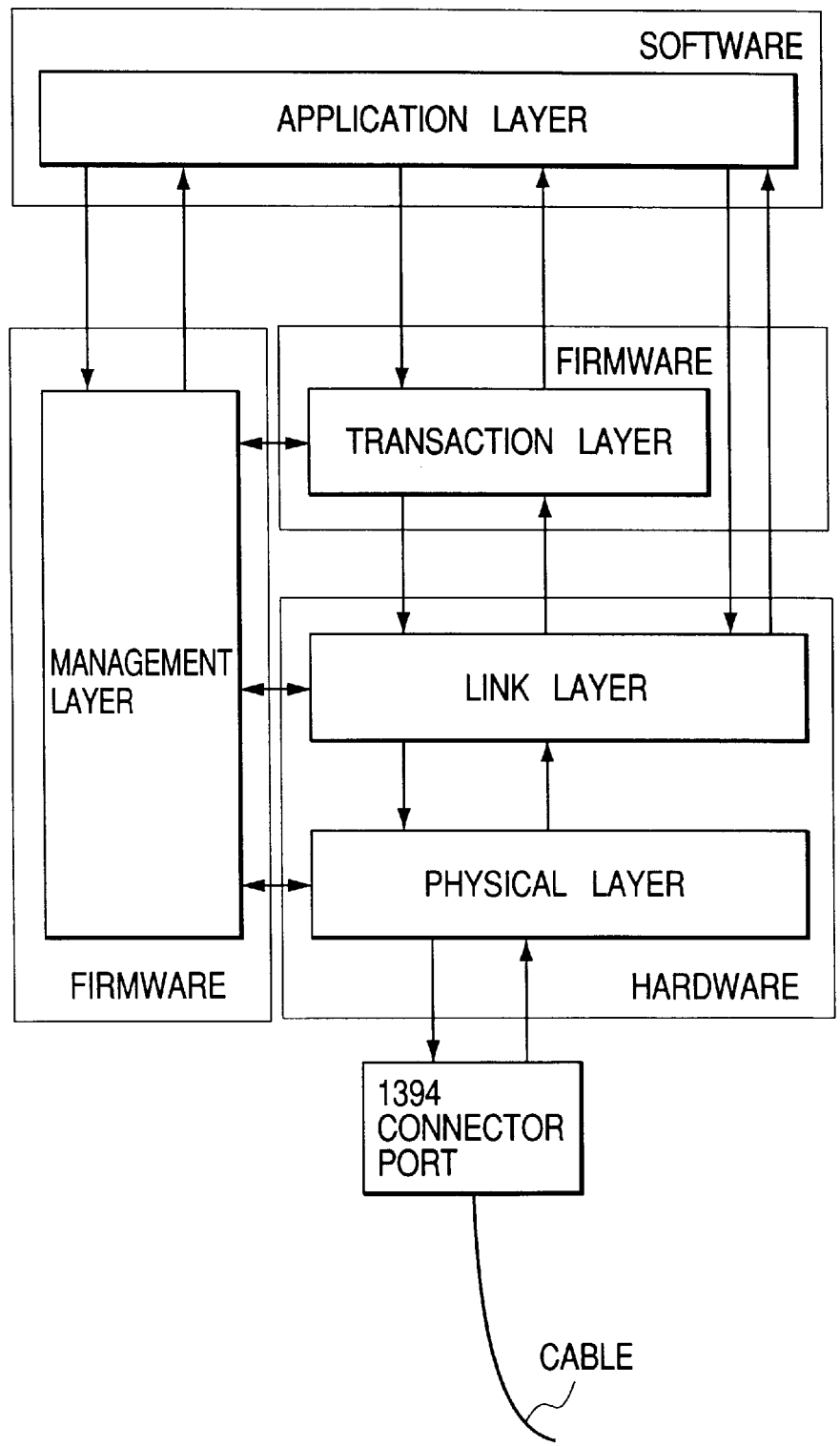
FIG. 3 shows a structure element of a 1394 serial bus according to the present invention.

Next, FIG. 3 shows a structure element of the 1394 serial bus.

The 1394 serial bus comprises a layer (hierarchy) structure as a whole. As shown in FIG. 3, it is the 1394 serial bus cable that is closest to a hardware. A connector port for connecting a cable connector thereto is provided. Over the connector port, a physical layer and a link layer are provided as the hardware.

A hardware section is a portion of an implemental interface chip. In the hardware section, the physical layer performs a coding, a control associated with the connector or the like. The link layer performs the transmission of a code packet, the control of a cycle time or the like.

A transaction layer in a firmware section manages the data to be transmitted (transacted). The transaction layer issues an instruction such as Read and Write. A management layer manages the connection condition and the ID's of the apparatuses connected to each other. The management layer is the portion for managing the network configuration.

The hardware and the firmware are the actual structure of the 1394 serial bus.

An application layer in a software section is different depending on a software to be used. The application layer is the portion for specifying how the data is loaded on the interface. This is specified in accordance with a protocol such as an AV protocol.

The structure of the 1394 serial bus is constituted as described above.

Figure 4:
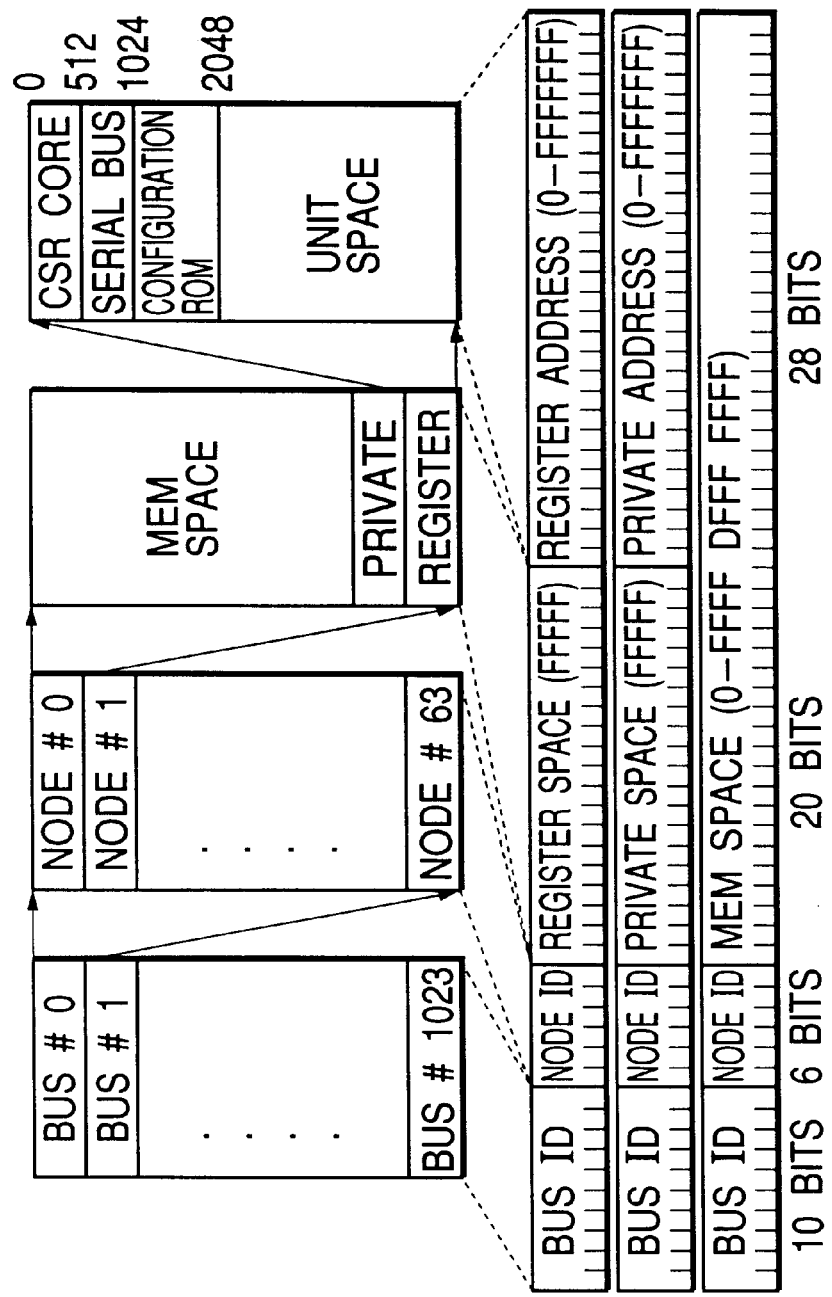
FIG. 4 shows an address space of the 1394 serial bus according to the present invention.

Next, FIG. 4 shows an address space of the 1394 serial bus.

The apparatuses (nodes) connected to the 1394 serial bus are sure to have a 64-bit address inherent in each node. This address is stored in ROM, whereby the apparatus can always recognize its own node address and the destination node address. Moreover, the apparatus can address and communicate with the destination apparatus.

An addressing of the 1394 serial bus is the system based on IEEE1212 standard. The address is set so that the first 10 bits may be used for specifying a bus number and the next 6 bits may be used for specifying a node ID number.

A 48-bit address available for each apparatus is divided into 20 bits and 28 bits. This address having the structure constituted of 256-Mbyte unit is used.

The first 20-bit 0-0xFFFFD is referred to as a memory space.

A portion 0xFFFFE is referred to as a private space. The private space is the address freely available for the apparatus.

A portion 0xFFFFF is referred to as a resister space. The information common to the apparatuses connected to the bus is stored in the resister space. The resister space is used for a communication between the apparatuses.

The first 512 bytes in the resister space include a resister (CSR core) which is to be a core of a CSR architecture.

The next 512 bytes include the resister of the serial bus.

In the subsequent 1024 bytes, a configuration ROM is provided.

The remaining portion is referred to as a unit space. The unit space includes the resister inherent in the apparatus.

Generally, in order to simplify a design of the system of different types of buses, the node should use the first 2048 bytes alone in an initial unit space. It is consequently desirable that the 1394 serial bus comprises 4096 bytes constituted of the core (CSR core) of the CSR architecture, the resister of the serial bus, the configuration ROM and the first 2048 bytes in the unit space.

The summary of the technique of the 1394 serial bus is as described above.

The technique, which is the feature of the 1394 serial bus, will be described in detail below.

[Electric specification of the 1394 serial bus]

Figure 5:
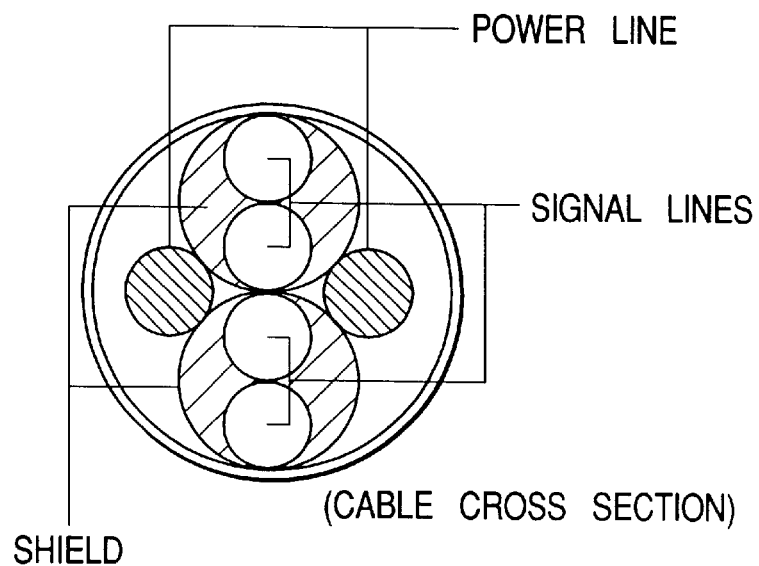
FIG. 5 shows a cross section of a 1394 serial bus cable according to the present invention.

FIG. 5 is a cross sectional view of the 1394 serial bus cable.

In addition to two pairs of twisted-pair signal lines, a power line is provided in a connect cable of the 1394 serial bus. This allow a power to be supplied to the apparatus having no power source, the apparatus whose voltage is reduced due to a trouble or the like.

The voltage of the power source flowing in the power line is 8–40 V. A current is specified so that a maximum current may be DC 1.5 A.

[DS-Link coding]

Figure 6:
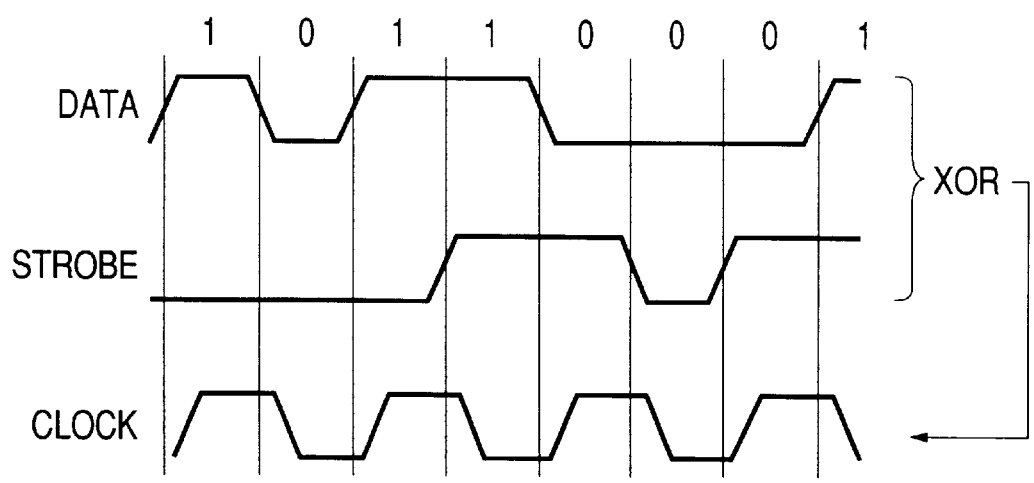
FIG. 6 shows a DS-Link coding system according to the present invention.

FIG. 6 is an illustration for describing a DS-Link coding system of a data transmission format adopted by the 1394 serial bus.

The 1394 serial bus adopts the DS-Link (Data/Strobe Link) coding system. This DS-Link coding system is suitable for a high-speed serial data communication. This configuration requires two signal lines. The configuration is constituted so that the main data may be transmitted to one of twisted-pair wires and a strobe signal may be transmitted to the other twisted-pair wire.

On a receiving side, an exclusive OR of this data to be communicated and the strobe is computed whereby a clock can be reproduced.

A merit in using this DS-Link coding system is as follows. A transmission efficiency is higher than the transmission efficiency of other serial data transmission system. Moreover, since a PLL circuit is unnecessary, the circuit of a controller LSI can be smaller in scale. Furthermore, since it is not necessary to transmit the information indicating an idle state when the data to be transmitted is absent, a transceiver circuit of each apparatus can be changed into a sleeve state, whereby the power to be dissipated can be thus reduced.

[Sequence of the bus reset]

A node ID is given to each apparatus (node) connected to the 1394 serial bus. This is recognized as the network configuration.

This network configuration is changed, for example, a change is caused by an increase/decrease of the number of nodes or the like due to an insertion/removal of the node, a switch-on/off of the power source or the like, whereby it is necessary to recognize the new network configuration. In this case, each node detecting the change transmits a bus reset signal onto the bus, whereby the node enters the mode for recognizing the new network configuration. At this time, a method of detecting the change is accomplished by detecting the change in a bias voltage on a 1394 port base.

The bus reset signal is transmitted from a certain node. The physical layer of each node receives this bus reset signal. At the same time, an occurrence of the bus reset is transmitted to the link layer. The bus reset signal is also transmitted to other node. Finally, after all the nodes detect the bus reset signal, the bus reset is started.

The bus reset is started by a hardware detection due to the insertion/removal of the cable, the trouble in the network or the like as described above. The bus reset is also started by issuing the instruction directly to the physical layer by a host control or the like from the protocol.

When the bus reset is started, the data transmission is temporarily stopped. During this temporary stop, the data transmission is in a waiting state. After the bus reset is completed, the data transmission is restarted in the new network configuration.

The sequence of the bus reset is accomplished as described above.

[Sequence of a node ID determination]

After the bus reset, each node starts an operation to give the ID to each node in order to construct the new network configuration. A general sequence from the bus reset to the node ID determination at this time will be described with reference to flow charts shown in FIGS. 7, 8, 9A and 9B.

Figure 7:
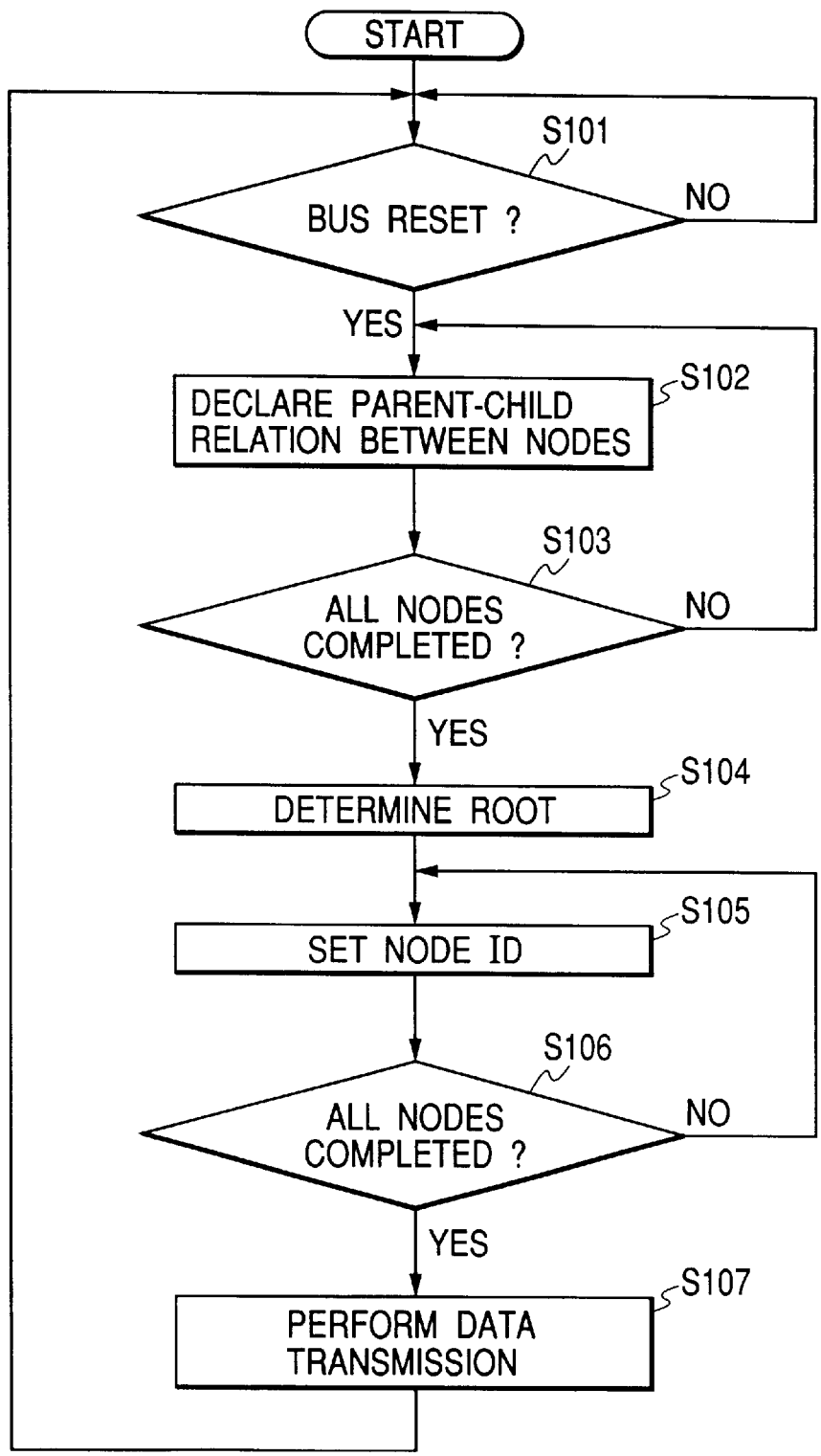
FIG. 7 shows a sequence from a bus reset to a node ID determination according to the present invention.

The flow chart of FIG. 7 shows a series of operation which the bus performs until the data transmission can be performed from the occurrence of the bus reset through the node ID determination.

In the first place, in step S101, the occurrence of the bus reset in the network is monitored at all times. When the bus reset occurs due to the switch-on/off of the power source of the node or the like, the operation proceeds to step S102.

In step S102, from the condition in which the network is reset, in order to know the connection condition of the new network, a parent-child relation between the nodes connected directly to each other is declared. When the parent-child relation between all the nodes is determined in step S103, a single root is determined in step S104. Until the parent-child relation between all the nodes is determined, the parent-child relation is declared in step S102. The root is not determined.

When the root is determined in step S104, a node ID setting operation for giving the ID to each node is subsequently performed in step S105. The node ID is set in a predetermined node order. The setting operation is repeated until the ID is given to all the nodes. Finally, when a setting of the ID to all the nodes is completed in step S106, the new network configuration is recognized by all the nodes. Thus, in step S107, the bus is changed into the state capable of the data transmission between the nodes. The data transmission is then started.

When the operation reaches to step S107, the operation again enters the mode for monitoring the occurrence of the bus reset. When the bus reset occurs, the setting operation from steps S101 to S106 is repeated.

Figure 8:
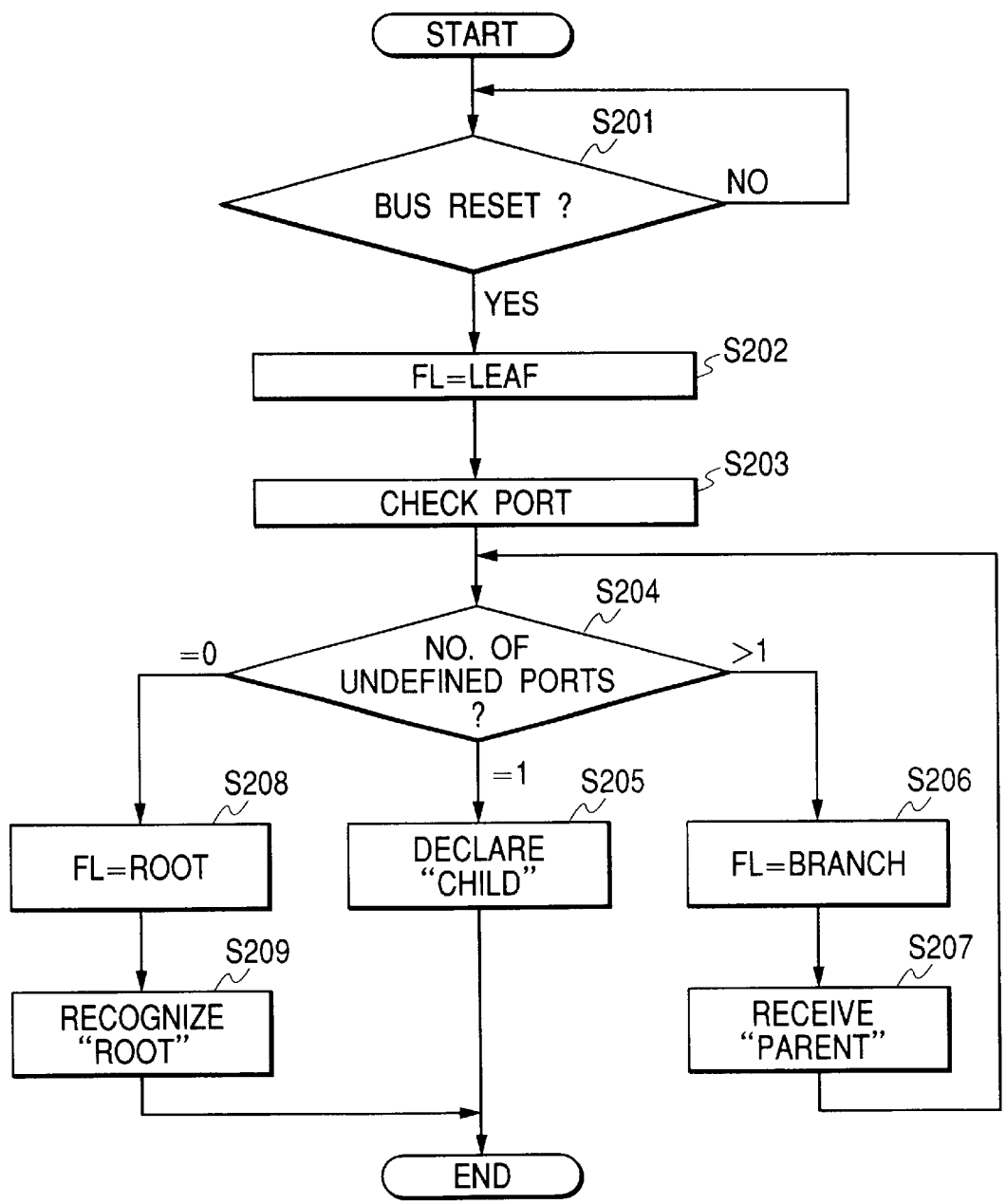
FIG. 8 shows the sequence from the bus reset to the node ID determination according to the present invention.
Figures 9, 9A:
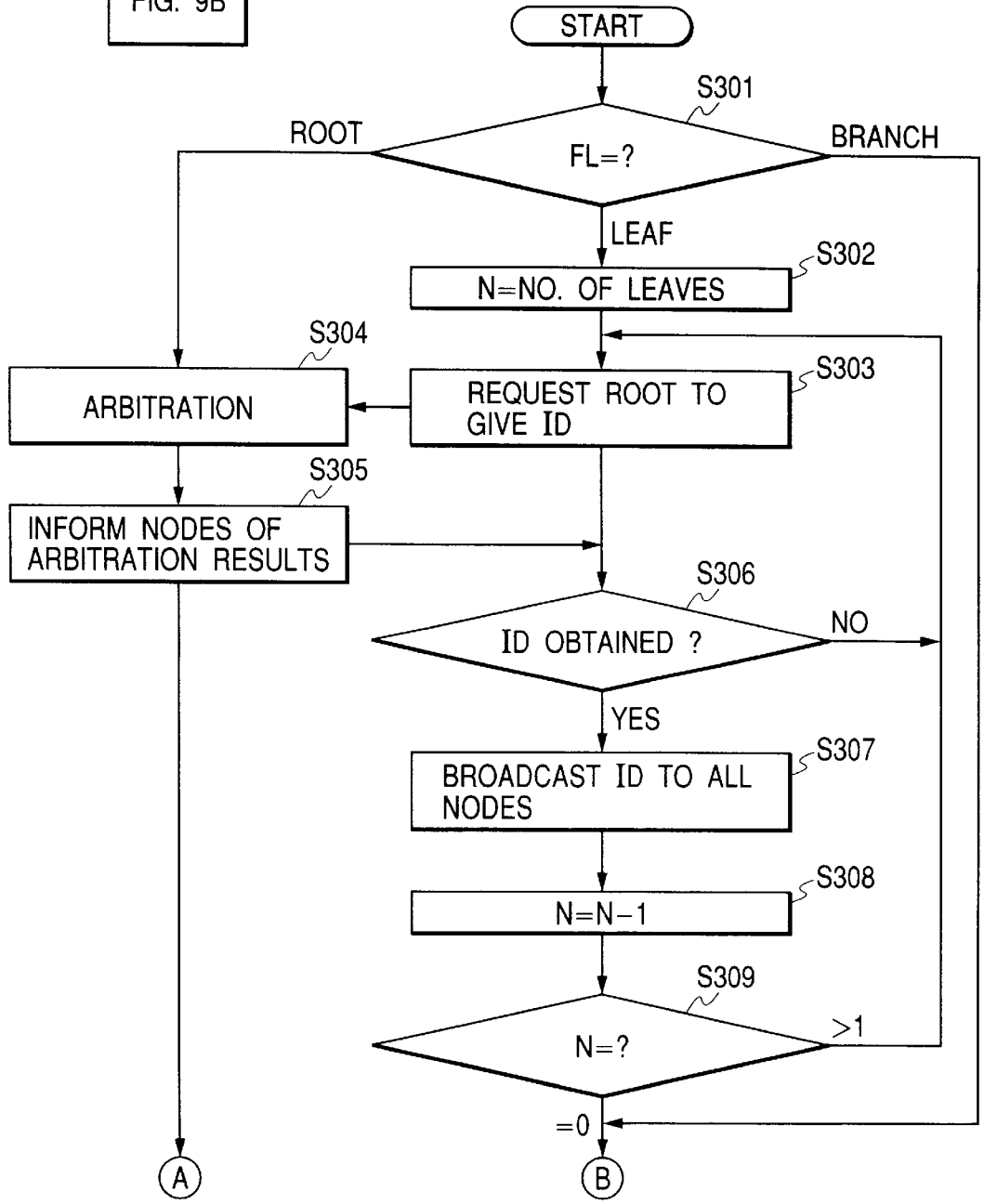
FIG. 9 is comprised of FIGS. 9A and 9B showing the sequence from the bus reset to the node ID determination according to the present invention.
Figure 9B:
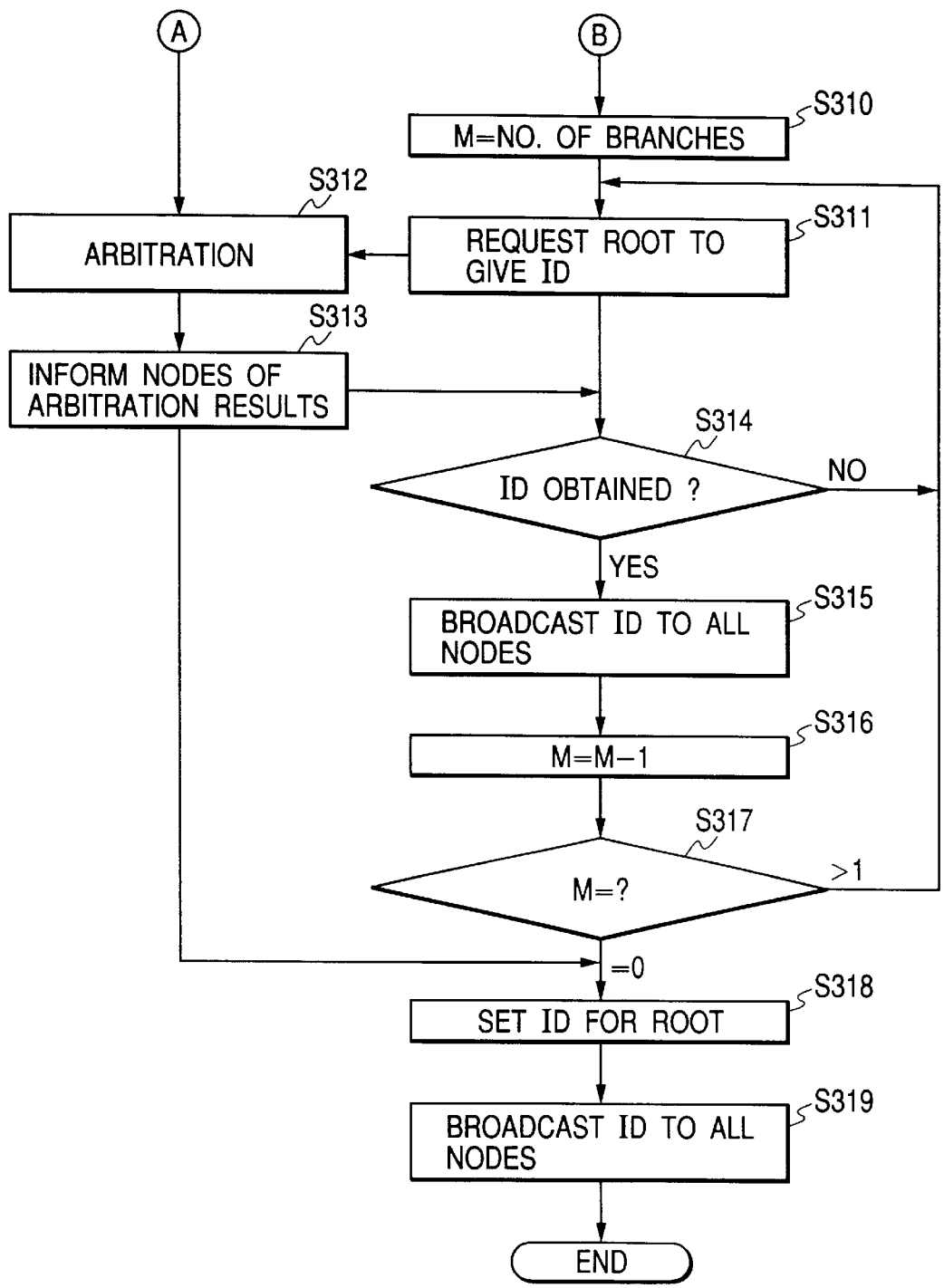

The flow chart of FIG. 7 is described above. FIGS. 8, 9A and 9B are the flow charts showing in more detail a part from the bus reset to a root determination and a procedure from the root determination to an ID setting completion shown in the flow chart of FIG. 7, respectively.

In the first place, the flow chart of FIG. 8 will be described.

In step S201, when the bus reset occurs, the network configuration is once reset. In step S201, the occurrence of the bus reset is monitored at all times.

Next, in step S202, in a first step of the operation to again recognize the connection condition of the reset network, each apparatus is flagged in order to indicate that it is a leaf (node). Furthermore, in step S203, how many ports of each apparatus are connected to other nodes is checked.

In order to start to declare the parent-child relation in accordance with a result of the number of ports in step S204, the number of undefined ports (where the parent-child relation is not determined) is checked. Just after the bus reset, the number of ports=the number of undefined ports. As the parent-child relation is determined, the number of undefined ports detected in step S204 is changed.

Just after the bus reset, it is the leaf only that can first declare the parent-child relation. Whether or not the apparatus is the leaf can be known by confirming the number of ports in step S203. In step S205, the leaf declares "the leaf itself is a child and the node connected to the leaf is a parent" to the node connected to the leaf. The operation is then completed.

In step S203, the node is recognized to be a branch since it has a plurality of ports. This means that, just after the bus reset, the number of undefined ports>1 in step S204. Thus, the operation proceeds to step S206. In the first place, the node is flagged in order to indicate that it is the branch. In step S207, the node waits in order to receive "parent" from the leaf by a parent-child relation declaration.

The leaf declares the parent-child relation, whereby the branch receives "parent" in step S207. The branch appropriately confirms the number of undefined ports in step S204. If the number of undefined ports reaches to 1, the branch can declare "the branch itself is the child" in step S205 to the node connected to the remaining ports. After twice and later, if the number of undefined ports is confirmed in step S204 and two or more branches are present, the branch again waits in order to receive "parent" from the leaf or other branches in step S207.

Finally, any one of branches or an exceptional leaf (which remains unchanged, since it is not rapidly operated in spite of the fact that it can declare "child") reaches to 0 as a result of the number of undefined ports in step S204. This means that the parent-child relation declaration is completed in the whole network. In step S208, only the node, in which the number of undefined ports reaches to 0 (that is, all the ports are determined to be the parent), is flagged in order to indicate that it is the root. In step S209, this node is recognized to be the root.

In such a manner, the operation from the bus reset shown in FIG. 8 to the parent-child relation declaration between all the nodes in the network is completed.

The flow charts of FIGS. 9A and 9B will be described below.

Since flag information of each node indicating the leaf, the branch and the root is set by the sequence up to FIG. 8, the nodes are first classified in step S301 in accordance with the flag information.

In the operation to give the ID to each node, it is the leaf that the ID can be first set to. The low-numbered (node number=0 . . . ) ID's are set to the leaf, the branch and the root in this order.

In step S302, the number N (where N denotes a natural number) of the leafs which are present in the network is set. After this step, in step S303, each leaf requests the root to give the ID. When a plurality of requests are sent, the root performs an arbitration (the operation to arbitrate so as to make a single request) in step S304. In step S305, the ID is given to a single winning node. The losing nodes are informed of an arbitration result indicating a failure. In step S306, the leaf, which fails in obtaining the ID, again sends the ID request. The same operation is repeated. In step S307, the leaf, which can obtain the ID, broadcasts ID information of the node to all the nodes. When a broadcast of the ID information of one node is completed, the number of the remaining leaves is reduced by 1 in step S308. In step S309, when the number of the remaining leaves is one or more, the operation for the ID request in step S303 is repeated. When all the leaves finally broadcast the ID information, N=0 in step S309. Next, the operation proceeds to a branch ID setting.

The branch ID setting is also performed in the same manner as the leaf.

In the first place, in step S310, the number M (where M denotes the natural number) of the branches which are present in the network is set. After this step, in step S311, each branch requests the root to give the ID. The root performs the arbitration in step S312. The low-numbered ID's next to the ID numbers given to the leaves are given to the branches in the winning order. In step S313, the root informs the requesting branches of the ID information or a failure result. In step S314, the branch, which fails in obtaining the ID, again sends the ID request. The same operation is repeated. In step S315, the branch, which can obtain the ID, broadcasts the ID information of the node to all the nodes. When the broadcast of the ID information of one node is completed, the number of the remaining branches is reduced by 1 in step S316. In step S317, when the number of the remaining branches is one or more, the operation for the ID request in step S311 is repeated. Until all the branches finally broadcast the ID information, the operation is performed. When all the branches obtain the node ID, M=0 in step S317. The mode for obtaining the branch ID is also completed.

When the above-described operation is completed, the node which does not obtain the ID information is finally the root alone. Thus, in step S318, the lowest number of the numbers not given to the node is set to the ID number of the root. In step S319, the ID information of the root is broadcasted.

As described above, as shown in FIGS. 9A and 9B, the procedure from a parent-child relation determination to the setting of the ID of all the nodes is completed.

The operation of the actual network shown in FIG. 10 as an example will be described below with reference to FIG. 12.

Figure 10:
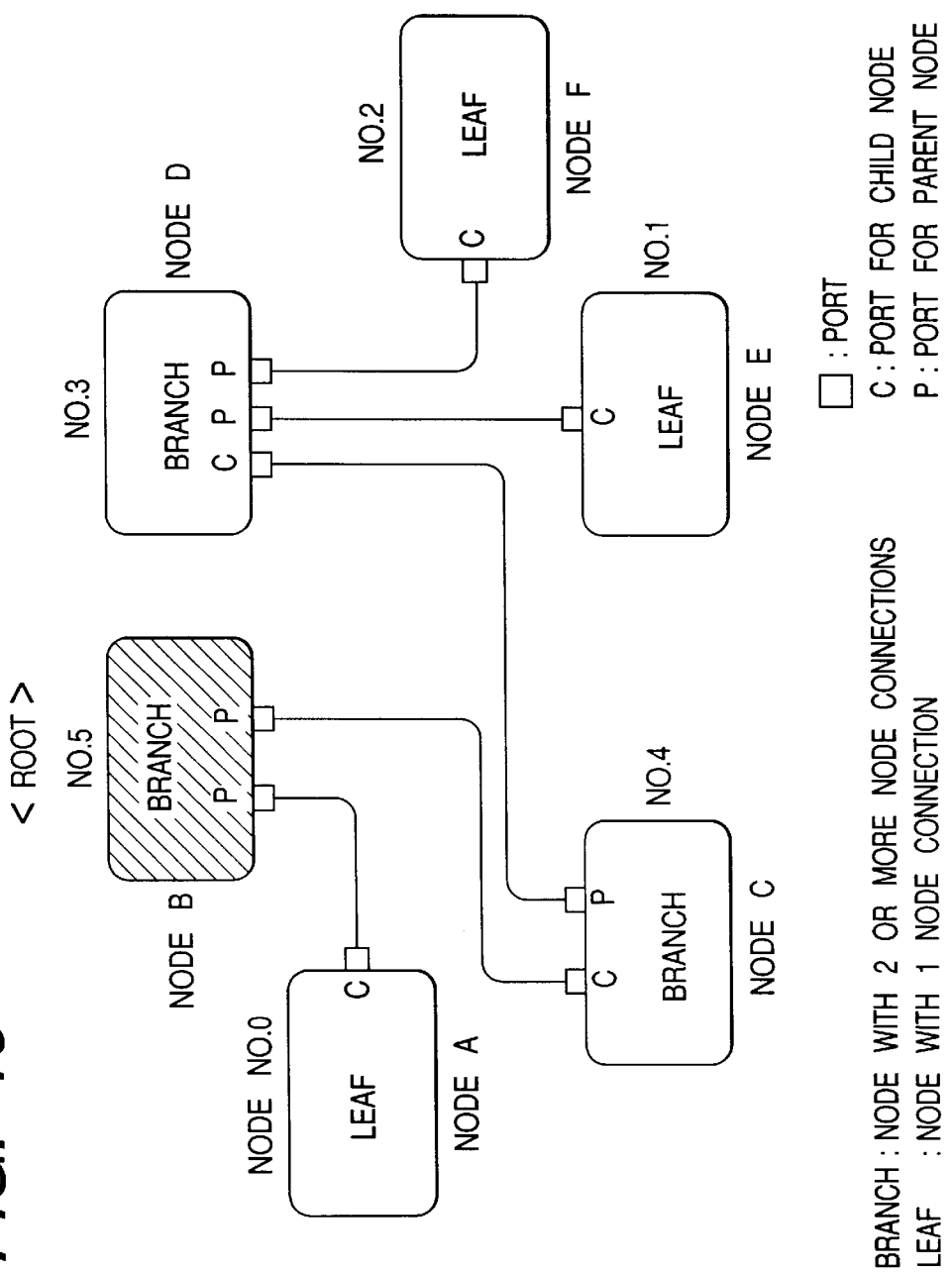
FIG. 10 shows a network operation according to the present invention.

Referring to FIG. 10, a node A and a node C are connected directly to a low order of a (root) node B. A node D is also connected directly to the lower order of the node C. A node E and a node F are also connected directly to the lower order of the node D. Such a hierarchy structure is constructed. The procedure for determining the hierarchy structure, the root node and the node ID will be described below.

After the bus reset, in order to recognize the connection condition of the nodes, the parent-child relation is first declared between the ports connected directly to the nodes. In this parent-child relation, it can be said that a parent node is a higher order and a child node is the lower order in the hierarchy structure.

In FIG. 10, after the bus reset, it is the node A that first declares the parent-child relation. Basically, the node (referred to as the leaf) connected to a single port alone of the node can declare the parent-child relation. Since the node can first know that it is connected to a single port alone, the node thus recognizes that it is located on an end of the network. The nodes determine the parent-child relation in the order of the rapidly operated nodes. The port of the node which thus declares the parent-child relation (the node A in case of the nodes A and B) is set to the child. The port of the other node (the node B) is set to the parent. In such a manner, the nodes A and B are determined to be the child and the parent, respectively. The nodes E and D are determined to be the child and the parent, respectively. The nodes F and D are determined to be the child and the parent, respectively.

One more step is advanced in the hierarchy. The nodes, among the nodes (referred to as the branches) having a plurality of connect ports, declare the parent-child relation to the much higher order in the order in which the nodes receive the parent-child relation declaration from the other node. In FIG. 10, in the first place, the node D determines the parent-child relation between the nodes D and E and between the nodes D and F. The node D then declares the parent-child relation to the node C. As a result, the nodes D and C are determined to be the child and the parent, respectively.

The node C, which receives the parent-child relation declaration from the node D, declares the parent-child relation to the node B connected to the other port. Thus, the nodes C and B are determined to be the child and the parent, respectively.

The hierarchy structure shown in FIG. 10 is thus constituted. The node B which is the parent in all the ports connected thereto is finally determined to be the root node. Only one root is present in a single network configuration.

In FIG. 10, the node B is determined to be the root node. However, if the node B, which receives the parent-child relation declaration from the node A, declares the parent-child relation to other nodes at a quick timing, the other node can be the root node. That is, any nodes can be the root node depending on the timing of the transmission. Therefore, even if the network is configured in the same manner, the root node is not always fixed.

When the root node is determined, the operation then enters the mode for determining each node ID. In this mode, each of all the nodes informs all the other nodes of its own determined node ID (a broadcast function).

The node's own ID information includes the node's own node number, the information about a connection position, the number of the ports possessed by the node, the number of the ports connected to the nodes, the information about the parent-child relation of the ports or the like.

The procedure for allocating the node ID number is accomplished in the following manner. In the first place, the node (leaf) connected to a single port alone can be started. The node numbers=0, 1, 2, . . . are sequentially allocated to the nodes.

When the node obtains the node ID, the node broadcasts the information including the node number to each node. Thus, the ID number is recognized to be "allocated".

When all the leaves finish obtaining their own node ID's, the node ID's are then allocated to the branches. The node ID numbers following the numbers allocated to the leaves are allocated to the nodes. In the same manner as the leaf, the branches broadcast the node ID information in the order in which the node ID numbers are allocated to the branches. Finally, the root node broadcasts its own ID information. That is, the root has the maximum node ID number at all times.

As described above, an allocation of the node ID is completed in the whole hierarchy structure. The network configuration is reconstructed. An initialization of the bus is completed.

[Control information for a node management]

The CSR core shown in FIG. 4 is present on the resister as the basic function of the CSR architecture for the node management.

The position and the function of the resisters are shown in FIG. 11. An offset in this drawing represents a relative position with respect to 0xFFFFF0000000.

In the CSR architecture, the resister associated with the serial bus is located from 0xFFFFF0000200. The position and the function of the resisters are shown in FIG. 12.

In a location starting from 0xFFFFF0000800, the information as to a node resource of the serial bus is located. The position and the function of the resisters are shown in FIG. 13.

The CSR architecture has the configuration ROM for representing the function of each node. The ROM takes a minimum form and a general form. The ROM is located from xFFFFF0000400.

In the minimum form, as shown in FIG. 14, a vender ID alone is represented. This ID is a numerical value represented by 24 bits and inherent in the whole world.

As shown in FIG. 15, the general form of ROM has the information about the node. In this case, the vender ID can be contained in root directory.

In bus info block and root leaf, a 64-bit unit number including the vender ID and inherent in the whole world is contained.

This unit number is used for continuously recognizing the node after a reconstruction of the bus reset or the like.

[Serial bus management]

As shown in FIG. 3, the protocol of the IEEE1394 bus comprises the physical layer, the link layer and the transaction layer.

The bus management provides the basic function for a node control and a bus resource management based on the CSR architecture.

A single node alone for performing the bus management is present and operated on the bus. This node for the bus management provides a management function for other nodes on the serial bus. This management function includes a cycle master control, a performance optimization, a power management, a transmission speed management, a configuration management or the like.

When the bus management function is generally classified, the bus management function comprises three functions of a bus manager, an isochronous resource manager and a node control.

The node control is the management function in which the CSR permits the communication between the nodes in the physical layer, the link layer, the transaction layer and the application.

The isochronous resource manager is the management function required for an isochronous data transmission on the serial bus. The isochronous resource manager is for managing an isochronous data transmission bandwidth and the allocation of a channel number.

A single node alone for this management is present on the bus. After a bus initializing phase, this node is dynamically selected from the nodes having the isochronous resource manager function.

This node is also used for determining a bus manager node. In the configuration in which the bus manager node is absent on the bus, an isochronous resource manager node performs a partial function of the bus manager such as the power management and the cycle master control.

The bus manager is the management function for performing a service to provide a bus control interface over the application. The control interface includes a serial bus control request (SB CONTROL. request), a serial bus event control confirmation (SB CONTROL. confirmation) and a serial bus event indication (SB EVENT. indication).

SB CONTROL. request is used, when the bus reset, the bus initialization, the bus state information or the like is requested of the bus management from the application.

SB CONTROL. confirmation is used, when the bus manager confirms the result of SB CONTROL. request and the bus manager informs the application of the result.

SB EVENT. indication is used, when the bus manager informs the application of an asynchronous event.

[Data transmission protocol]

In case of the data transmission by IEEE1394, the isochronous data (isochronous packet) required to be periodically transmitted and the asynchronous data (asynchronous packet) allowed to be transmitted/received at an optional timing are simultaneously present. Real time properties of isochronous transmission data are also ensured.

When the data transmission is performed, prior to the transmission, a right to use the bus is requested and the buses are arbitrated in order to obtain an acceptance of the use.

In case of the asynchronous transmission, a transmitting node ID and a receiving node ID are transmitted as packet data together with the transmission data. When a receiving node confirms its own ID and receives the packet, the receiving node sends an acknowledge signal to a transmitting node. A single transaction is thus completed.

In case of the isochronous transmission, the transmitting node side requests an isochronous channel together with the transmission speed. A channel ID is transmitted as the packet data together with the transmission data. A receiving node side confirms a desired channel ID. The receiving node side receives the data packet.

The number of necessary channels and the transmission speed are determined by the application layer.

The data transmission protocol is defined by the three layers of the physical layer, the link layer and the transaction layer.

The physical layer functions as a physical/electrical interface with the bus. The physical layer performs an automatic recognition of a node connection, a bus arbitration in order to obtain the right to use the bus between the nodes on the bus, or the like.

The link layer performs the addressing, a data check, a packet transmission/reception and a cycle control for the isochronous transmission.

The transaction layer performs the processing relating to the asynchronous data.

The processing in each layer will be described below.

*Physical Layer

Figure 17:
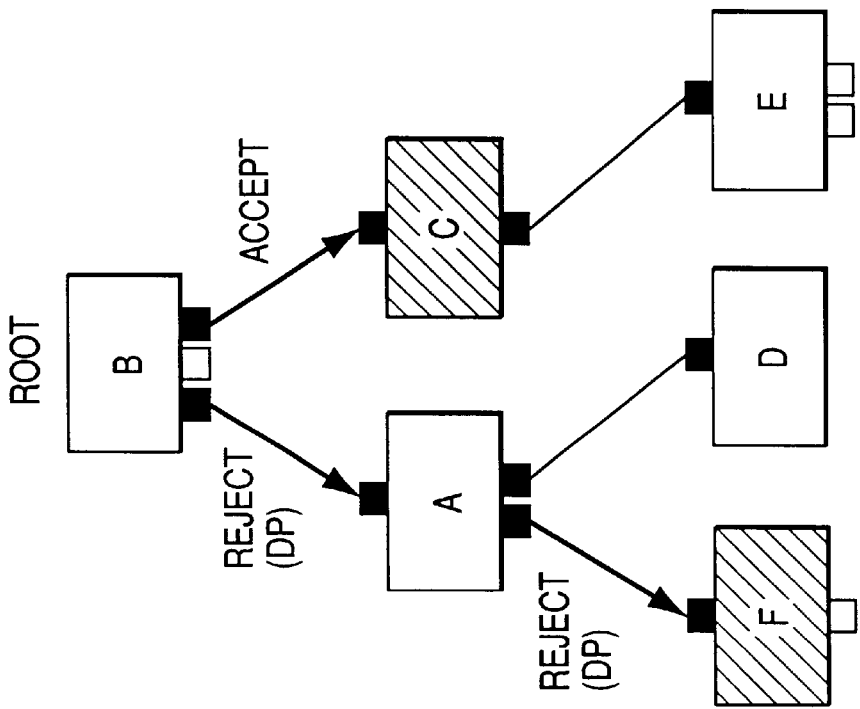
FIG. 17 shows an acceptance of a use of the serial bus according to the present invention.
Figure 16:
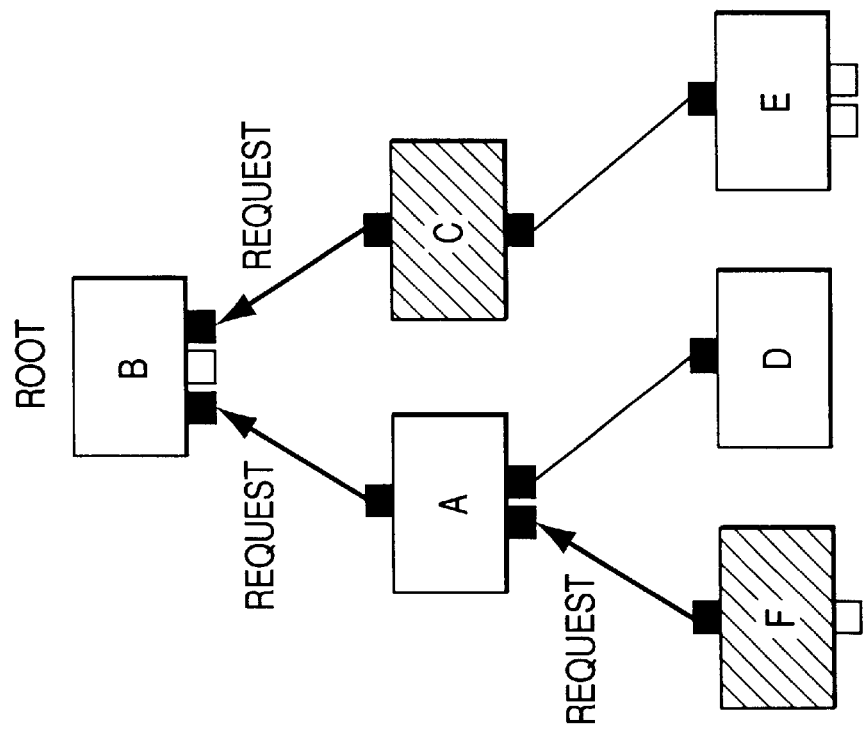
FIG. 16 shows a request to use the serial bus according to the present invention.

In order to describe the bus arbitration in the physical layer, FIG. 16 shows the request for the use of the bus and FIG. 17 shows the acceptance of the use of the bus. The processing will be described with reference to FIGS. 16 and 17.

When the arbitration is started, one node or plural nodes sends/send the request for the right to use the bus to the parent node. The nodes C and F shown in FIG. 16 are the nodes sending the request for the right to use the bus. The parent node receiving this request (the node A in FIG. 16) also sends (relays) the request for the right to use the bus to the parent node. This request is finally delivered to the root for performing the arbitration.

The root node receiving the request for the right to use the bus determines which node is allowed to use the bus. This arbitration operation can be accomplished by the root node alone. The right to use the bus is given to the node which wins the arbitration. In FIG. 17, the acceptance of the use is given to the node C and the node F is rejected for the use. A DP (data prefix) packet is sent to the node which loses the arbitration so as to thereby inform the losing node of a rejection. The use-of-bus request from the rejected node is caused to wait for the next arbitration.

As described above, the node, which wins the arbitration and obtains the use-of-bus acceptance, can start the data transmission from this time on.

Figure 18:
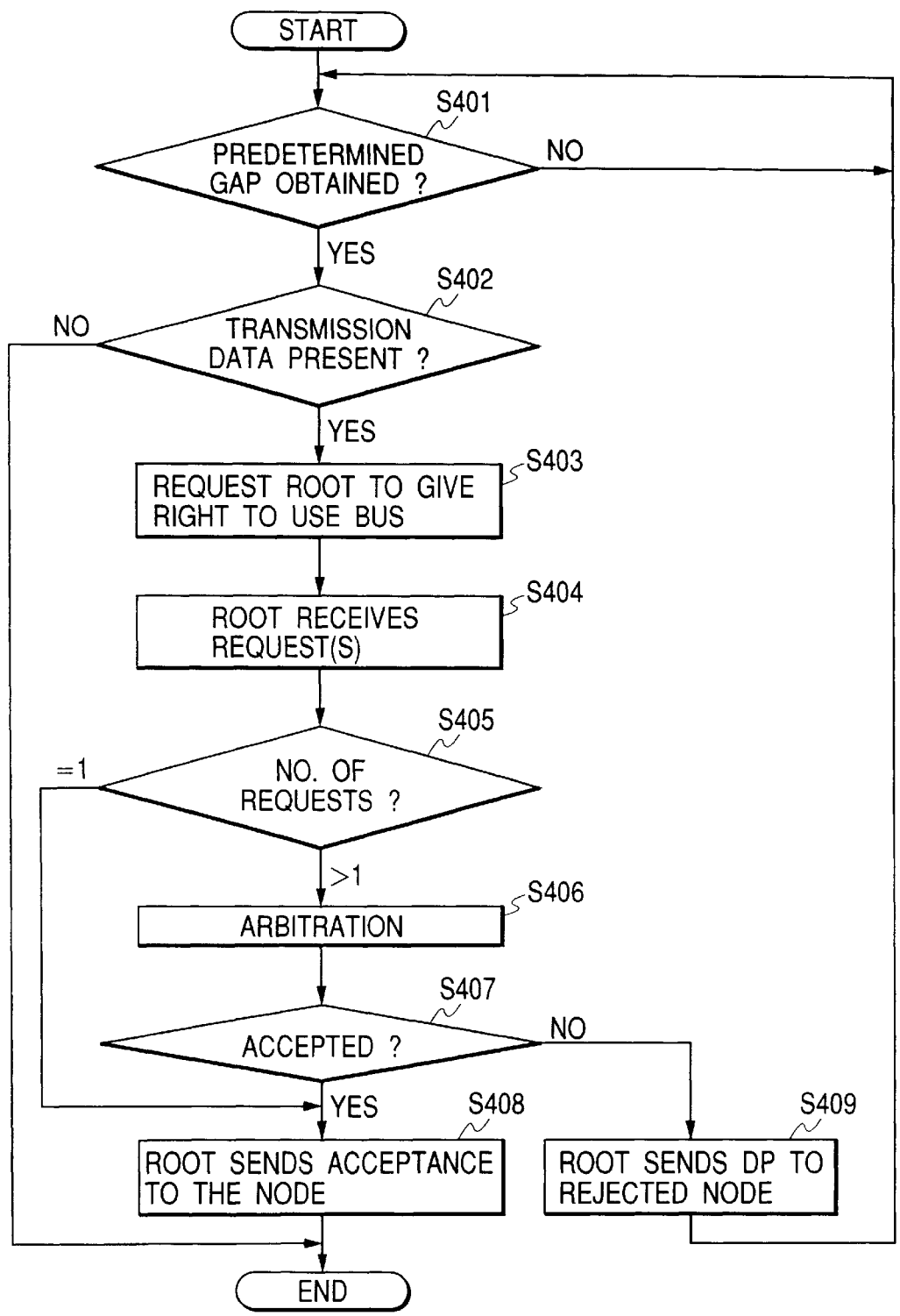
FIG. 18 is a flow chart showing a flow of an arbitration of the serial bus according to the present invention.

A series of flow of the arbitration is shown in FIG. 18 and described below.

In order that the node can start the data transmission, the bus needs to be the idle state. In order to recognize that the previous data transmission is completed and the bus is currently in the idle state, a predetermined idle time gap length (e.g. a subaction gap) individually set by each transmission mode is allowed to elapse. Thus, each node judges that it can start its own transmission.

In step S401, whether or not a predetermined gap length in accordance with the data to be transmitted such as the Async data and the Iso data is obtained is determined. As long as a predetermined gap length is not obtained, it is not possible to make the request for the right to use the bus required for starting the transmission. Therefore, the node waits until a predetermined gap length is obtained.

When a predetermined gap length is obtained in step S401, whether or not the data to be transmitted is present is determined in step S402. If the data is present, in step S403, the request for the right to use the bus is sent to the root so that the bus may be ensured in order to transmit the data. At this time, as shown in FIGS. 16 and 17, the signal indicating the request for the right to use the bus is relayed by the apparatuses in the network while it is transmitted. The signal is finally delivered to the root. When the data to be transmitted is absent in step S402, the node waits as it is.

Next, in step S404, the root receives one or more use-of-bus request of step S403. At this time, in step S405, the root checks the number of nodes sending the use request. In step S405, if a select value represents the number of nodes=1 (that is, a single node sends the request for the right to use the bus), the immediate use-of-bus acceptance is given to the node. In step S405, if the select value represents the number of nodes>1 (that is, a plurality of nodes send the request for the use), in step S406, the root performs the arbitration in order to determine a single node to which the acceptance of the use is to be given. This arbitration is impartially performed. The same node alone does not obtain the acceptance at all times. The right is equally given to the nodes.

In step S407, the root arbitrates between a plurality of nodes sending the request for the use in step S406. The nodes are thus selected so that they may be classified into one node obtaining the acceptance of the use and the other losing nodes. In step S408, the root sends an acceptance signal to one node obtaining the acceptance of the use as a result of the arbitration or the node obtaining the acceptance of the use without the arbitration due to the select value representing the number of the nodes requesting for the use=1 in step S405. Immediately after the node obtaining the acceptance receives the acceptance signal, the node starts to transmit the data (packet) to be transmitted. In step S409, the DP (data prefix) packet indicating the failure in the arbitration is sent from the root to the node which does not obtain the use-of-bus acceptance due to a loss of the arbitration in step S406. In order to resend the request for the use of the bus for the transmission, the node receiving this DP packet returns to step S401 and waits until it obtains a predetermined gap length.

The above description is provided for the flow chart of FIG. 18 for describing the flow of the arbitration.

*Transaction Layer

The transactions are of three types of a read transaction, a write transaction and a lock transaction.

In the read transaction, an initiator (request node) reads the data in a specific address memory of a target (response node).

In the write transaction, the initiator writes the data into the specific address memory of the target.

In the lock transaction, the initiator transmits reference data and update data to the target. The reference data is processed in combination with address data of the target. The addressed data of the target is updated.

Figure 19:
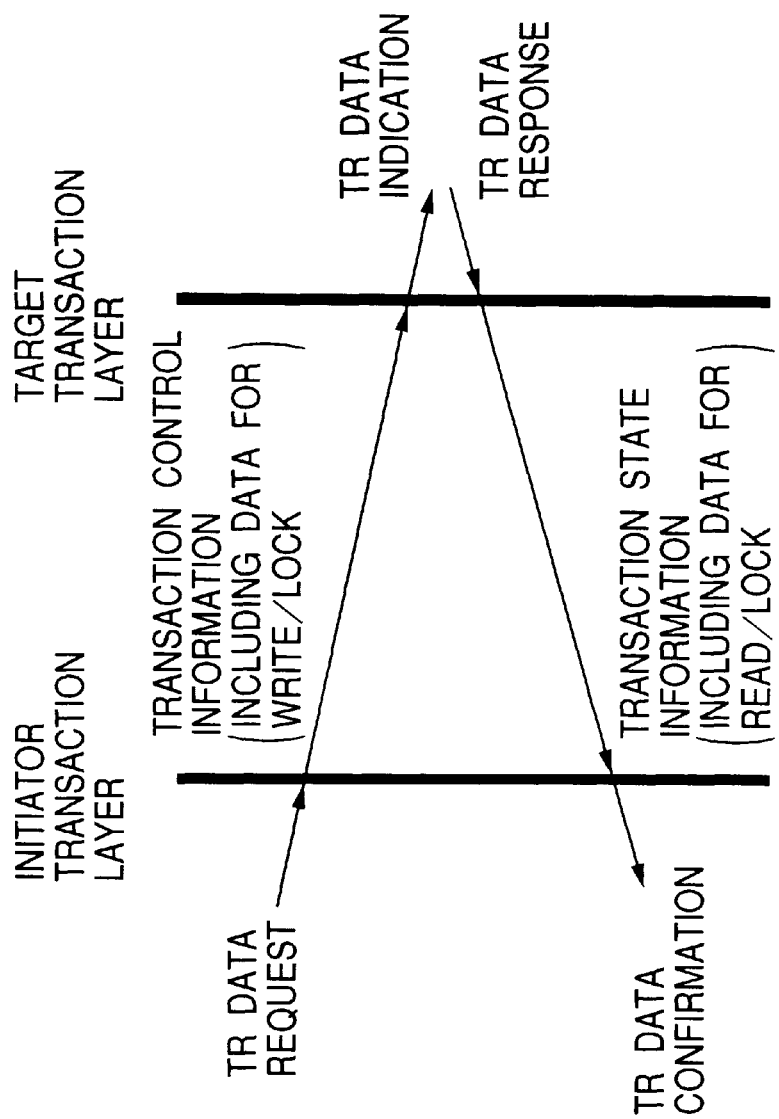
FIG. 19 shows a service of a transaction layer of the serial bus according to the present invention.

FIG. 19 shows the request/response protocols for read, write and lock commands based on the CSR architecture in the transaction layer. The request, the indication, the response and the confirmation shown in FIG. 19 are a service unit in the transaction layer.

A transaction request (TR DATA. request) is indicative of the transmission of the packet to the response node. A transaction indication (TR DATA. indication) is indicative of the indication of the fact that the request reaches to the response node. A transaction response (TR DATA. response) is indicative of the transmission of the acknowledge. A transaction confirmation (TR DATA. confirmation) is indicative of the reception of the acknowledge.

*Link Layer

Figure 20:
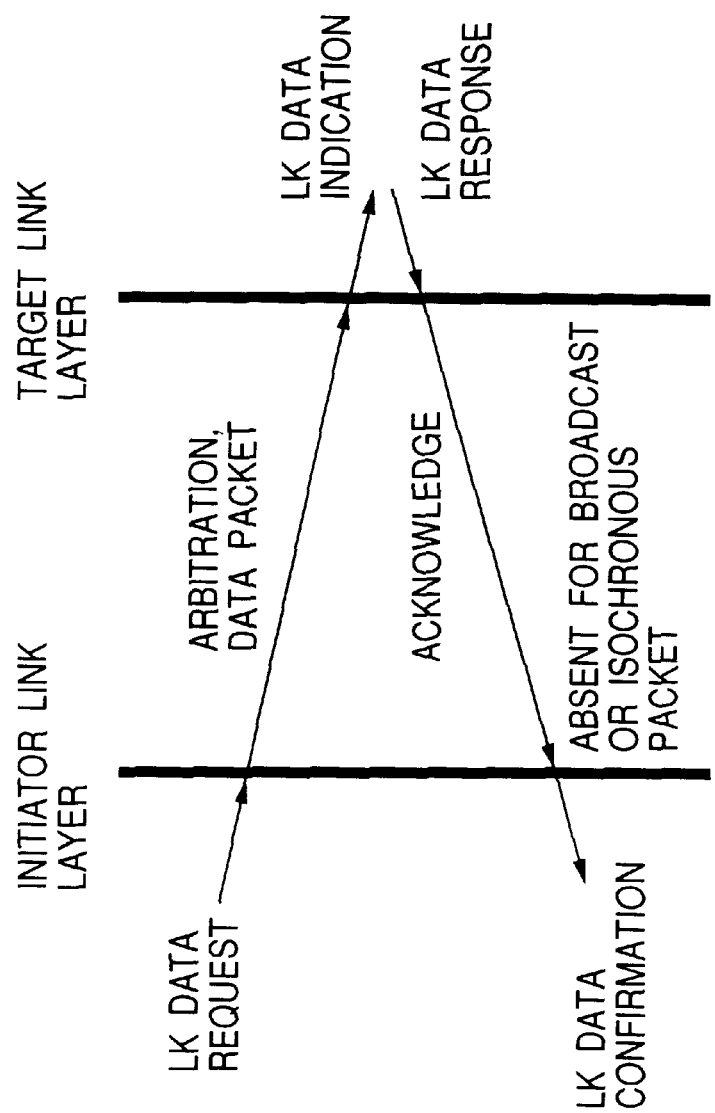
FIG. 20 shows the service of a link layer of the serial bus according to the present invention.

FIG. 20 shows the service in the link layer. The service is classified into the following service units: a link request (LK DATA. request) for requesting the transmission of the packet to the response node, a link indication (LK DATA. indication) for indicating the reception of the packet to the response node, a link response (LK DATA. response) for the transmission of the acknowledge from the response node and a link confirmation (LK DATA. confirmation) for the transmission of the acknowledge from the request node.

A single packet transmission process is referred to as the subaction. The subactions are of two types of an asynchronous subaction and an isochronous subaction.

The operation of each subaction will be described below.

[Asynchronous Subaction]

Figure 21:
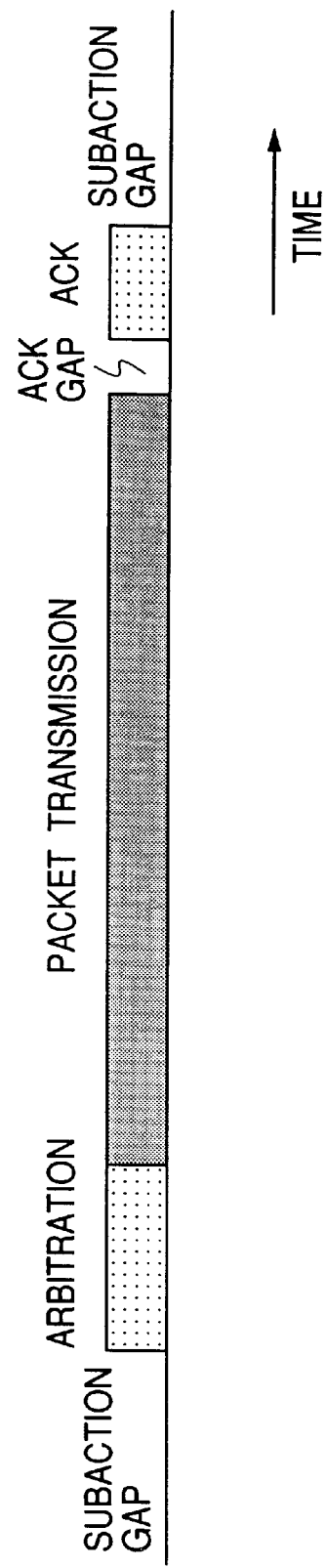
FIG. 21 shows a transition of an asynchronous transmission according to the present invention.

The asynchronous subaction is an asynchronous data transmission. FIG. 21 shows a time transition of the asynchronous transmission. The first subaction gap of FIG. 21 shows the idle state of the bus. When an idle time reaches to a constant value, the node desiring the transmission judges that the bus can be used. The arbitration for obtaining the bus is executed.

When the acceptance of the use of the bus is obtained by the arbitration, the data transmission is then executed in a packet form. After the data transmission, the node receiving the data responds by sending an ack (acknowledge code) indicating the result of the reception of the transmitted data after a short gap referred to as an ack gap. Alternatively, a response packet is transmitted whereby the transmission is completed. The ack comprises 4-bit information and 4-bit checksum. The ack includes the information on whether the transmission is successful, busy or pending. The ack is soon sent to a source.

Next, the example of a packet format of the asynchronous transmission is shown in FIG. 22.

The packet includes a header field as well as a data field and error correcting data CRC. As shown in FIG. 22, a destination node ID, a source node ID, a transmission data length, various codes and the like are written in the header field, whereby the transmission is performed.

The asynchronous transmission is also a one-to-one communication from the source node to the destination node. Although the packet transmitted from the source node is delivered over all the nodes in the network, the packets transmitted to addresses other than a destination address are ignored. Thus, a single destination node alone reads the packet.

The above description is provided for the asynchronous transmission.

[Isochronous Subaction]

The isochronous subaction is the isochronous data transmission. The isochronous transmission can be said to be the most significant feature of the 1394 serial bus. More specifically, the isochronous transmission is the transmission mode suitable for the transmission of the data requiring the real-time transmission, for example, multimedia data such as video image data and audio data.

The asynchronous transmission is the one-to-one transmission, while the isochronous transmission is a uniform transmission from a single source node to all the other nodes by the broadcast function.

Figure 23:
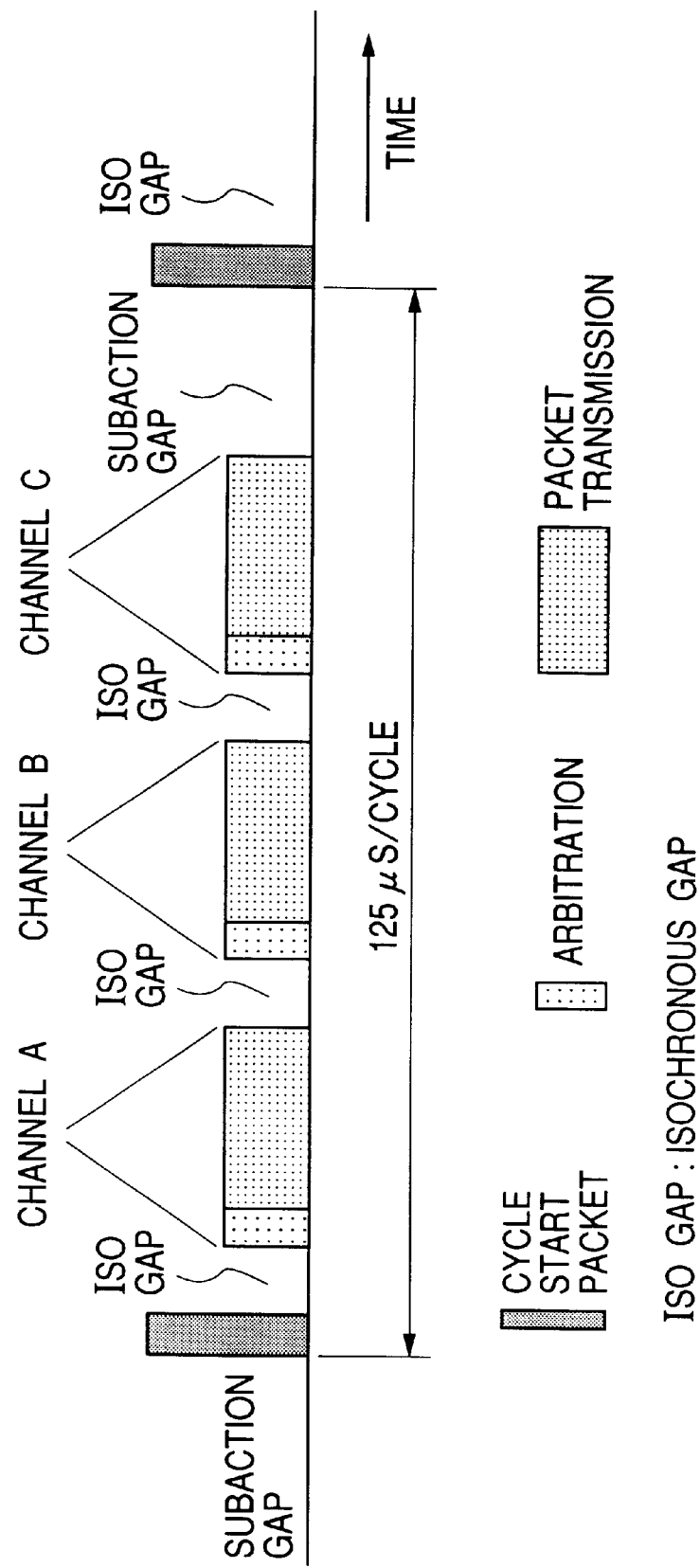
FIG. 23 shows the transition of an isochronous transmission according to the present invention.

FIG. 23 shows the time transition of the isochronous transmission.

The isochronous transmission is executed on the bus at a constant time interval. This time interval is referred to as an isochronous cycle. An isochronous cycle time period is 125 $\mu S$. It is the cycle start packet that serves to indicate a start time of each cycle and to adjust the time of each node. It is the node referred to as a cycle master that transmits the cycle start packet. After the transmission is completed in one cycle previous to the current cycle, a predetermined idle period (subaction gap) elapses. After an elapse of this period, the cycle start packet indicating the cycle start is transmitted. The time interval for the transmission of the cycle start packet is set to 125 $\mu S$.

As a channel A, a channel B and a channel C are shown in FIG. 23, the channel ID's are given to plural types of packets in one cycle, whereby the packets can be distinguished and transmitted. Thus, the real-time transmission can be simultaneously performed between a plurality of nodes. The receiving node captures the data alone of a desired channel ID. This channel ID is not indicative of the destination address but merely gives a logical number to the data. Therefore, a certain packet is transmitted by the broadcast so that it may be delivered over all the other nodes from a single source node.

Prior to the packet transmission by the isochronous transmission, the arbitration is performed in the same manner as the asynchronous transmission. However, unlike the asynchronous transmission, the isochronous transmission is not the one-to-one communication. Thus, the ack (acknowledge code) is not used for the isochronous transmission.

An iso gap (isochronous gap) shown in FIG. 23 is indicative of the idle period required for the confirmation of whether or not the bus is idle prior to the isochronous transmission. After a predetermined idle period elapses, the node desiring the isochronous transmission judges that the bus is idle. The arbitration can be thus performed before the transmission.

The example of the packet format for the isochronous transmission is shown in FIG. 24 and is described below.

Various packets divided into the respective channels include the header field as well as the data field and the error correcting data CRC. As shown in FIG. 24, the transmission data length, the channel number, various codes, an error correcting header CRC and the like are written into the header field, whereby the transmission is performed.

The above description is provided for the isochronous transmission.

FIG. 25 shows a detail of a packet field of the packet formats.

[Bus Cycle]

Figure 26:
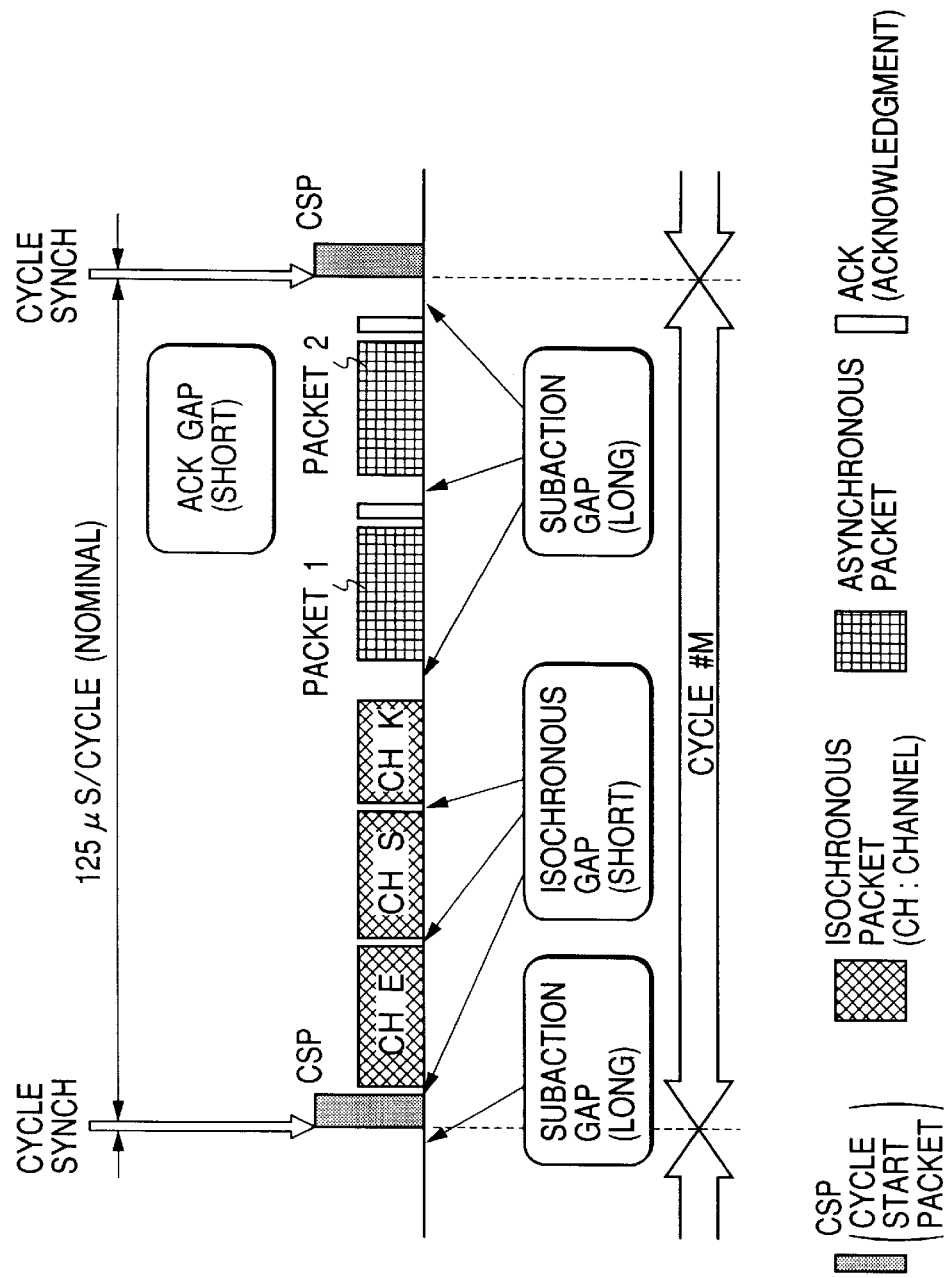
FIG. 26 shows the transition when the asynchronous transmission and the isochronous transmission according to the present invention are mixed.

The isochronous transmission and the asynchronous transmission can be mixed in the actual transmission on the 1394 serial bus. FIG. 26 shows the time transition of the transmission on the bus in which the isochronous transmission and the asynchronous transmission are mixed.

The isochronous transmission is executed in preference to the asynchronous transmission. The reason is as follows. After the cycle start packet, the isochronous transmission can be started by the use of the gap length (isochronous gap) shorter than the gap length (subaction gap) of the idle period necessary for the start of the asynchronous transmission. Therefore, the isochronous transmission is executed in preference to the asynchronous transmission.

In a general bus cycle shown in FIG. 26, at the time of the start of a cycle #m, the cycle start packet is transmitted to each node from the cycle master. Thus, the time is adjusted in each node. After waiting for a predetermined idle period (isochronous gap), the node, which should perform the isochronous transmission, performs the arbitration. The node then starts the packet transmission. In FIG. 26, a channel E, a channel S and a channel K are sequentially transmitted by the isochronous transmission in this order.

The operation from the arbitration to the packet transmission is repeated as many times as the number of given channels. After this operation, when all the isochronous transmission is completed in the cycle #m, the asynchronous transmission can be performed.

The idle time reaches to the subaction gap capable of the asynchronous transmission, whereby the node desiring the asynchronous transmission judges that it can transit to an execution of the arbitration.

The asynchronous transmission can be performed, only when the subaction gap for starting the asynchronous transmission is obtained during a time period from the completion of the isochronous transmission to the time (cycle synch) at which the next cycle start packet is to be transmitted.

In the cycle #m shown in FIG. 26, the isochronous transmission is performed as many times as three channels. Two packets (a packet 1 and a packet 2) are then transmitted by the subsequent asynchronous transmission (including the ack). The time (cycle synch), at which a cycle m+1 is to be started, is reached after this asynchronous packet 2. Thus, the transmission in the cycle #m is completed at this time.

During an asynchronous or isochronous transmission operation, the time (cycle synch), at which the next cycle start packet is to be transmitted, is reached. In this case, the transmission is not forced to be stopped. After a waiting for the idle period after the completion of the transmission, the cycle start packet for the next cycle is transmitted. That is, when one cycle continues for 125 μS or more, the next cycle is reduced by an excess over the reference value 125 μS. In such a manner, the isochronous cycle can be exceeded and reduced on the basis of 125 μS.

However, if it is necessary to perform the isochronous transmission in every cycle in order to maintain the real-time transmission, the isochronous transmission is always executed. The cycle time is thus reduced, whereby the asynchronous transmission is sometimes performed in the next cycle or later.

Figure 27:
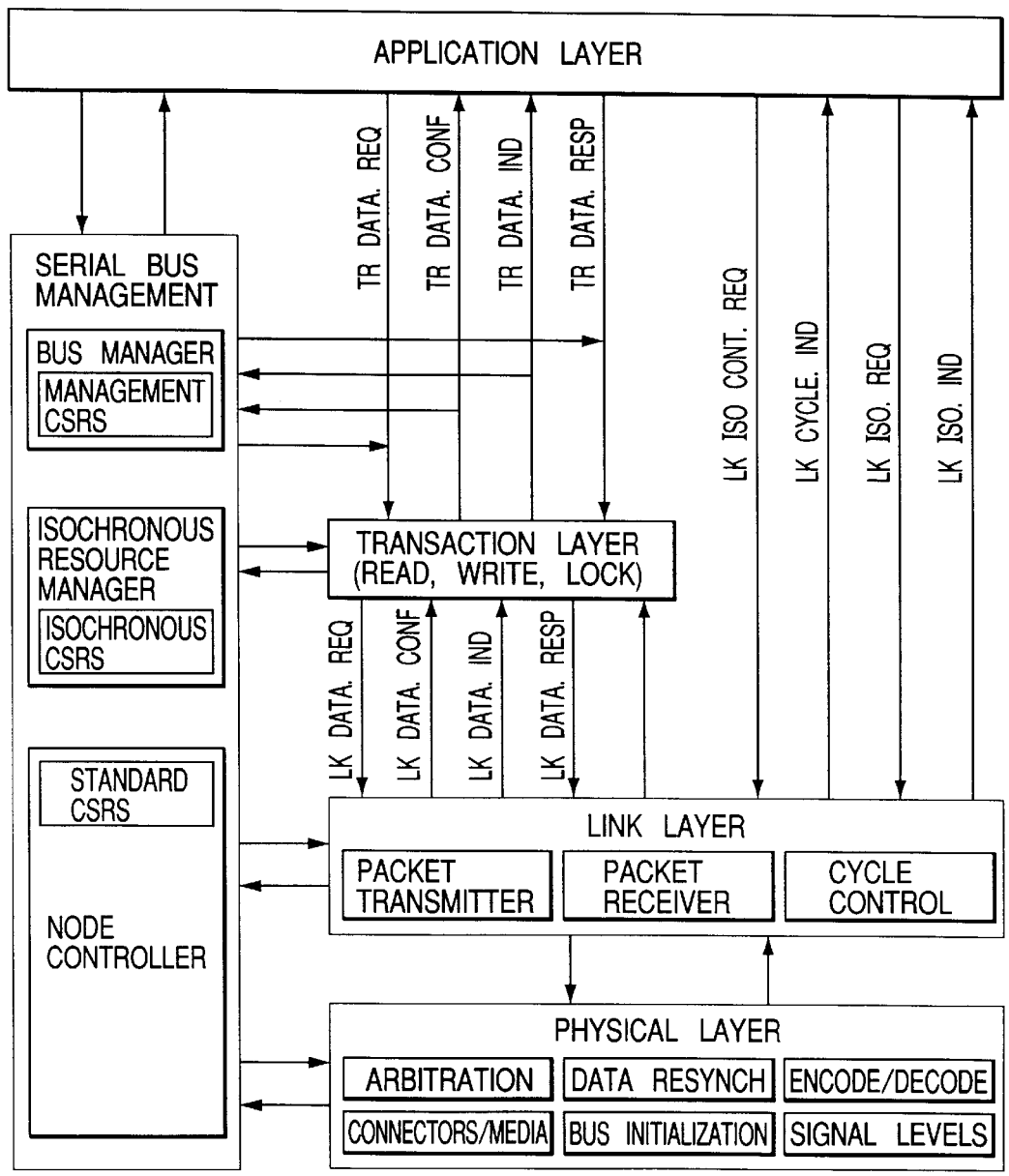
FIG. 27 shows a protocol architecture of IEEE1394 according to the present invention.

FIG. 27 shows a protocol architecture of IEEE1394. Referring to this drawing, the service among the layers, more specifically, the service among the application layer, the transaction layer and the link layer will be described below. Arrows show the service among the layers.

TR DATA. request is indicative of a data transaction service. The application or the bus management starts a write/read/lock data transaction by the use of this service.

TR DATA. confirmation is indicative of the service for confirming the transaction completion. At the time of the completion of a transaction data request, the transaction layer informs the request side node of the transaction completion by the use of this service.

TR DATA. indication is indicative of the service for indicating the reception of the transaction request. The transaction layer indicates the reception of the transaction request to an application node, a controller and the bus manager by the use of this service.

TR DATA. response is indicative of a transaction data response service. The transaction layer responds to the received packet by the use of this service, whereby the transaction is completed.

LK ISO CONTROL. request is indicative of an isochronous request service. The application layer informs the link layer of an isochronous channel list by the use of this service.

LK CYCLE. indication is indicative of the service for indicating a cycle synchronization. The link layer indicates a cycle synchronizing event to the application layer by the use of this service.

LK ISO. request is indicative of an isochronous request service. The application layer requests the link layer to transmit a single isochronous packet to the bus by the use of this service.

LK ISO. indication is indicative of an isochronous indication service. The link layer indicates the reception of the isochronous packet to the application layer by the use of this service.

[Printing system using a 1394 isochronous data transmission (host side)]

Figure 28:
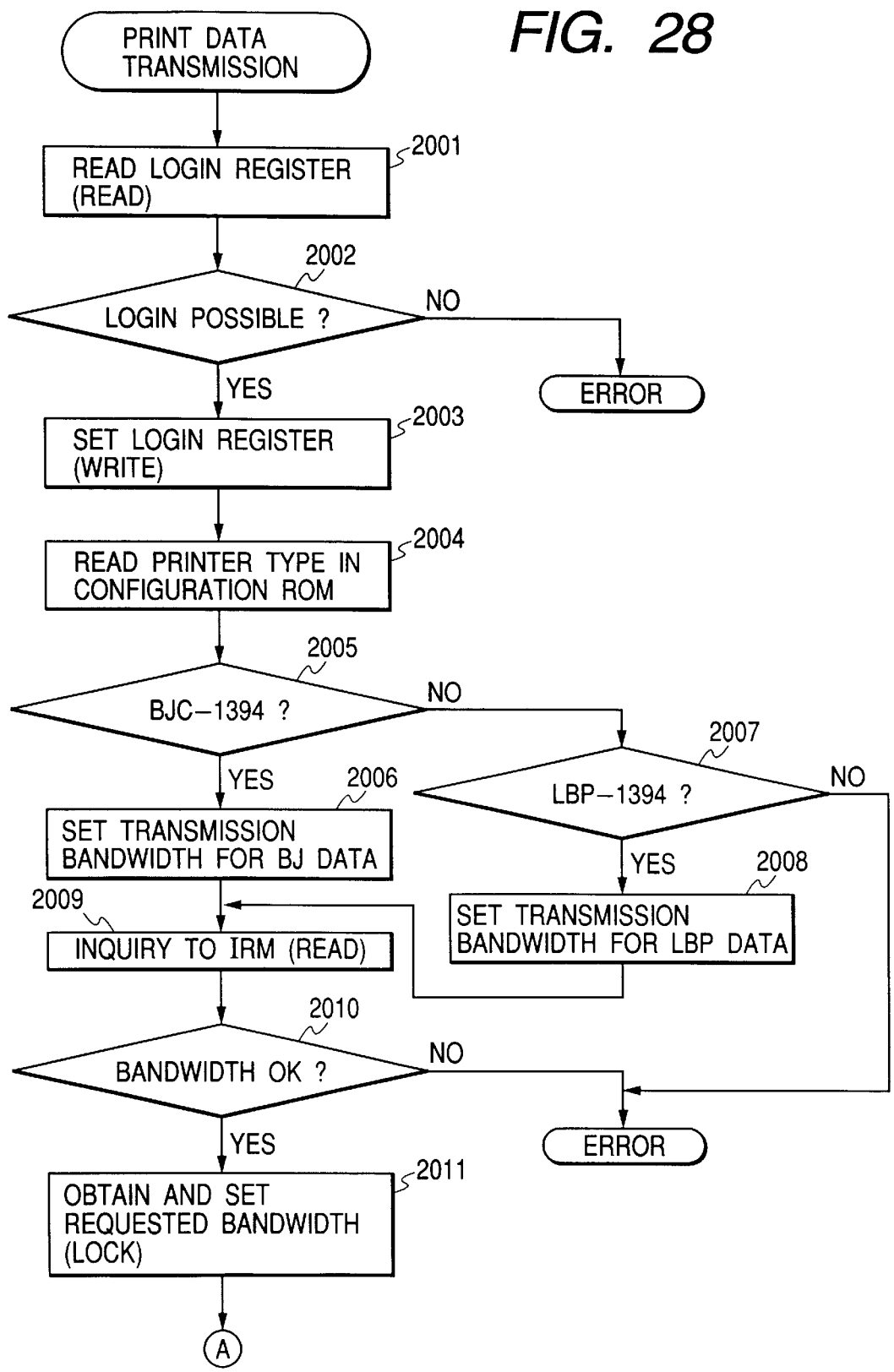
FIG. 28 is a flow chart showing a print sequence on a host side according to the present invention.
Figure 29:
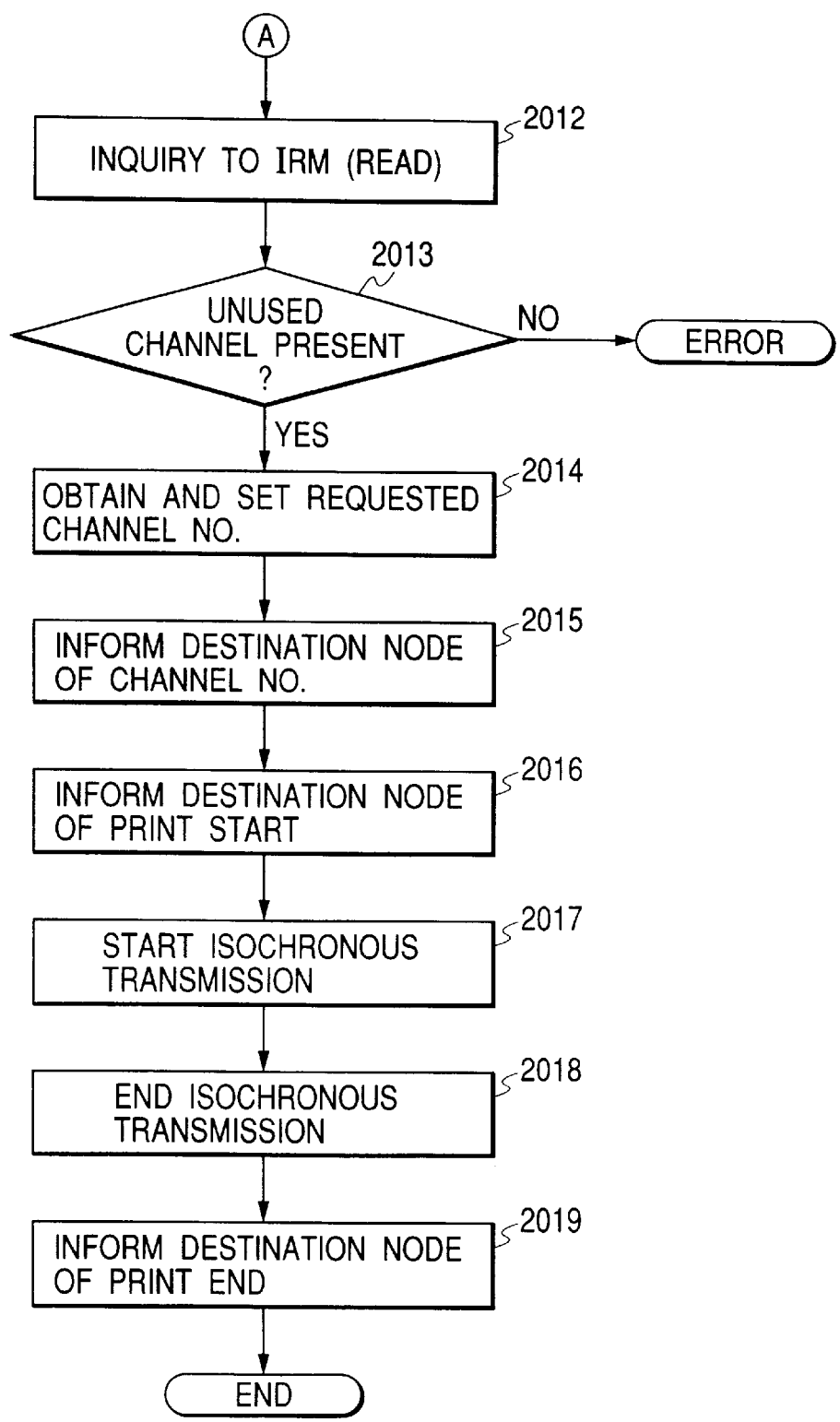
FIG. 29 is a flow chart showing the print sequence on the host side according to the present invention.

FIGS. 28 and 29 are flow charts showing a print sequence on the host side, for example, when print data is transmitted from the host (source node) such as the PC to the printer (destination node) by the use of the isochronous data transmission. When the print data transmission processing is started on the host side, the host side must first log in the target printer.

A login to the 1394 printer is accomplished in the following steps. In the first place, a login resister of the printer is read by the read transaction (step 2001). Whether or not the login is possible is determined in accordance with the value of the login resister (step 2002). The login resister of the printer is changed by the lock transaction (step 2003). If the login is now impossible in accordance with the value of the login resister, the application is informed of this impossibility. The data transmission processing is thus completed.

When the login processing is normally completed, a printer type in the configuration ROM of the printer is then read by the read transaction (step 2004). The printer type of an output destination is thus determined. In accordance with this printer type, the host side determines the bandwidth to be requested of the isochronous resource manager.

An object of the change in the bandwidth is the optimization of the data transmission bandwidth in the whole 1394 network. In case of a print-out processing by the 1394 isochronous transmission, the data transmission is possible above a print-out capability of the printer. Since the isochronous transmission has characteristics in which the as-unchanged transmission data must be received by the printer (that is, an error and a retry cannot be repeated for each packet), a data transmission capability must be determined in response to the print-out capability.

For example, the laser beam printer and the ink jet printer are generally different in the print-out capability. In case of this embodiment, the host side reads the resister of the printer side. The data transmission bandwidth to be requested of the isochronous resource manager is determined to be 5 M/s for the laser beam printer and to be 2 M/s for the ink jet printer, respectively.

The bandwidth is determined not only in accordance with the printer type, but also with reference to a parameter indicating whether the transmission data is color or monochrome or the like and having an influence on an amount of the transmission data so that an optimum data transmission bandwidth may be ensured within the print-out capability of the printer. Thus, the data transmission bandwidth can be optimally used in the whole 1394 network. More specifically, since a large amount of data is required for a color print, the bandwidth for the color print is set so that it may be greater than the bandwidth for a monochrome print. Furthermore, since the speed is important for monochrome data, the monochrome data is printed at high speed. Since a quality level is important for color data, the color data is printed at low speed. Therefore, the bandwidth for the monochrome data transmission is set so that it may be greater than the bandwidth for the color data transmission.

During the determination of the bandwidth, the bandwidth is changed not only by determining the printer type, but also by setting a driver (a draft mode and a fine mode) or the like even in case of the same type. In this case, in order to obtain the bandwidth for use in the isochronous data transmission, a maximum value of the currently allocatable bandwidth is first read from the isochronous resource manager by the read transaction (step 2009). The requested bandwidth determined in steps 2004–2008 is then compared to the allocatable bandwidth read in step 2009 (step 2010). If the bandwidth is allocatable, the requested bandwidth is obtained from the isochronous resource manager by the lock transaction (step 2011). If the requested bandwidth cannot be obtained, the application is informed of the fact that the bandwidth cannot be obtained. The data transmission processing is then completed.

When the bandwidth is obtained, the processing of determining the channel number is then performed for the isochronous transmission. In the first place, a current use state of the channel number is read from the isochronous resource manager by the read transaction (step 2012). Whether or not an unused channel number is present is then checked (step 2013). If the unused channel number is present, the channel number is obtained from the isochronous resource manager by the lock transaction (step 2014). If the unused channel number is absent, the application is informed of an absence. The data transmission processing is then completed.

The source node (the PC in this case) obtains the bandwidth and the channel number from the isochronous resource manager. Next, the source node writes the channel number into a channel number resister of the destination node (the printer in this case) by the use of the write transaction, whereby it informs the destination node of the channel number (step 2015). In the same manner as described above, a print start bit is written into a print start resister of the destination node by the use of the write transaction, whereby the destination node is informed of a print start (step 2016). The isochronous data transmission is thus started (step 2017).

When the isochronous data transmission is completed (step 2018), the destination node is informed of a print completion. This processing is accomplished by writing a print completion bit into the print start resister of the destination node by the use of the write transaction (step 2019).

Figure 30:
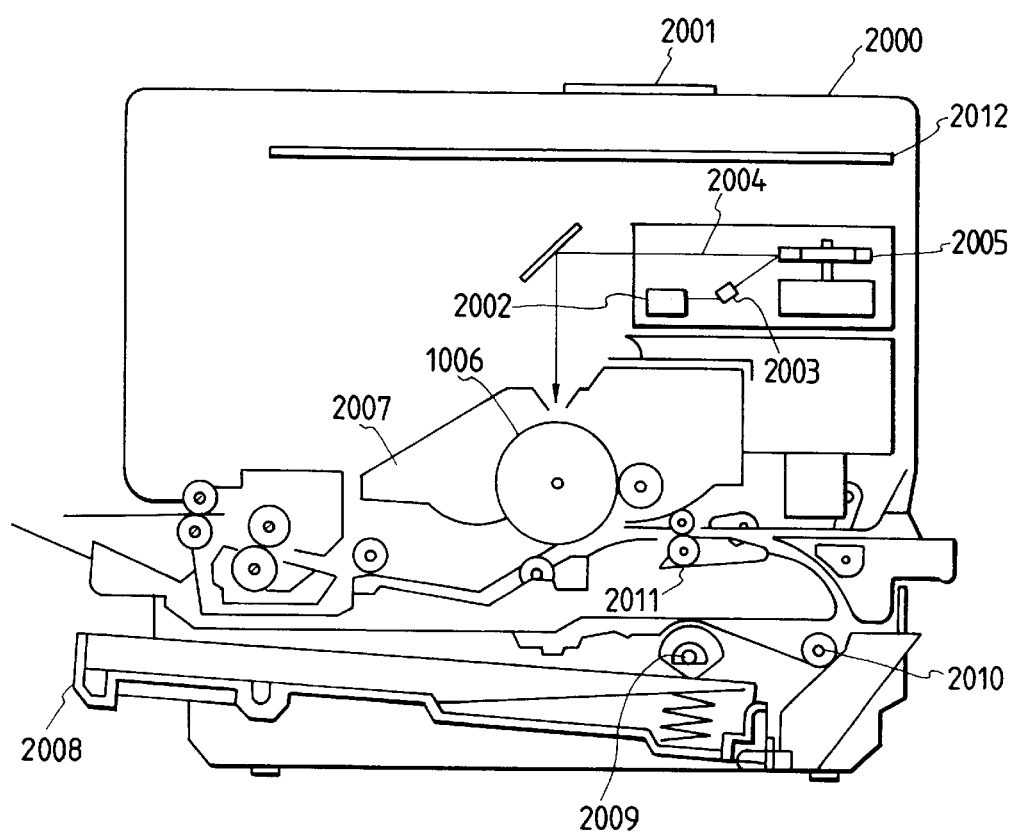
FIG. 30 shows the constitution of an outputting apparatus LBP according to the present invention.

FIG. 30 is a cross sectional view showing the constitution of a first outputting apparatus, for example, the laser beam printer (LBP).

In the drawing, numeral 2000 denotes an LBP body. Print information (a character code or the like), form information, a macro instruction or the like supplied from an externally connected host computer is input and stored in the LBP body 2000. The LBP body 2000 also generates a character pattern, a form pattern or the like in accordance with the information, whereby an image is formed on a recording medium such as a recording paper. Numeral 2001 denotes an operation panel on which a switch for the operation, an LED display or the like is arranged. Numeral 2012 denotes a printer control unit for controlling the whole LBP body 2000 and for analyzing character information or the like supplied from the host computer. The printer control unit 2012 mainly converts the character information into a video signal of the corresponding character pattern. The printer control unit 2012 outputs the video signal to a laser driver 2002. The laser driver 2002 is a circuit for driving a semiconductor laser 2003. The laser driver 2002 switches on/off a laser light 2004 emitted from the semiconductor laser 2003 in accordance with the input video signal. The laser light 2004 is horizontally oscillated by a rotary polygon mirror 2005, whereby a scanning exposure is performed on an electrostatic drum 2006. An electrostatic latent image of the character pattern is thus formed on the electrostatic drum 2006. The latent image is developed by a developing unit 2007 located around the electrostatic drum 2006, whereby the latent image is then transferred on the recording paper. A cut sheet is used for the recording paper. The cut sheet recording paper is contained in a paper cassette 2008 attached to the LBP 2000. The recording paper is taken into the apparatus by a paper feeding roller 2009 and carrying rollers 2010, 2011, whereby the paper is supplied to the electrostatic drum 2006. The LBP body 2000 is also provided with at least one or more card slot (not shown). An option font card added to an internal font and a control card (emulation card) of a different language system can be connected to the LBP body.

Figure 31:
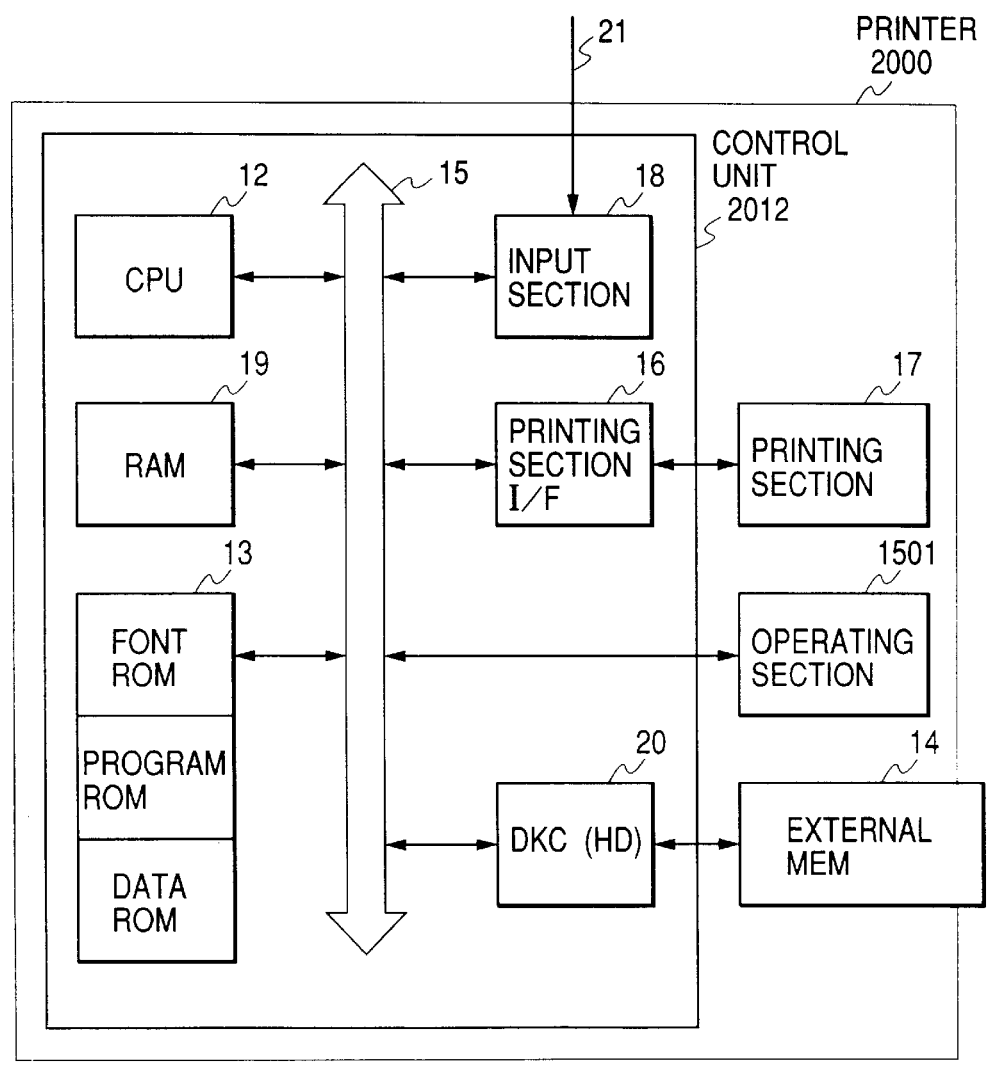
FIG. 31 is a block diagram showing the constitution of the outputting apparatus LBP according to the present invention.

FIG. 31 is a block diagram showing the constitution of the LBP according to the present invention.

In the printer 2000, numeral 12 denotes a printer CPU. The CPU 12 generally controls an access to various devices connected to a system bus 15 in accordance with a control program or the like stored in a program ROM of a ROM 13 or the control program or the like stored in an external memory 14. An image signal as output information is output to a printing section (printer engine) 17 connected to the CPU 12 through a printing section interface 16. The control program is stored in the program ROM of the ROM 13. Font data or the like for use in a generation of the output information is stored in a font ROM of the ROM 13. When the printer does not have the external memory 14 such as the hard disk, the information or the like for use in the host computer is stored in a data ROM of the ROM 13.

In case of the present invention, various information on the printer is accessible from an external apparatus through an input section 18 which is the 1394 interface. Such information includes the information on an alarm about the amount of the remaining paper in the paper cassette 2008 or the like. The access to the information will be described in items "serial bus configuration ROM" and "status register" in "Configuration of printer-side 1394 serial bus interface" described below.

Numeral 19 denotes a RAM which functions as a main memory, a work area or the like of the CPU 12. A memory capacity can be extended by an option RAM connected to an increased port (not shown). The RAM 19 is used for an output information expanding area, an environment data storing area, NVRAM or the like. The access to the above-described hard disk (HD) and the external memory 14 such as an IC card is controlled by a disk controller (DKC) 20. The external memory 14 is connected to the printer as an option. The font data, an emulation program, form data or the like is stored in the external memory 14. The operation switch, the LED display or the like on the operation panel is located in the input section 18.

The external memory is not limited to one in number. At least one or more external memory is provided. The external memory may be constituted so that a plurality of external memories, which store therein the option font card added to the internal font and the program for interpreting a printer control language of the different language system, can be connected to the LBP. The external memory may also have the NVRAM (not shown) so that printer mode setting information from the operation panel 2001 may be stored therein.

*Constitution of the Ink Jet Printer

Figure 32:
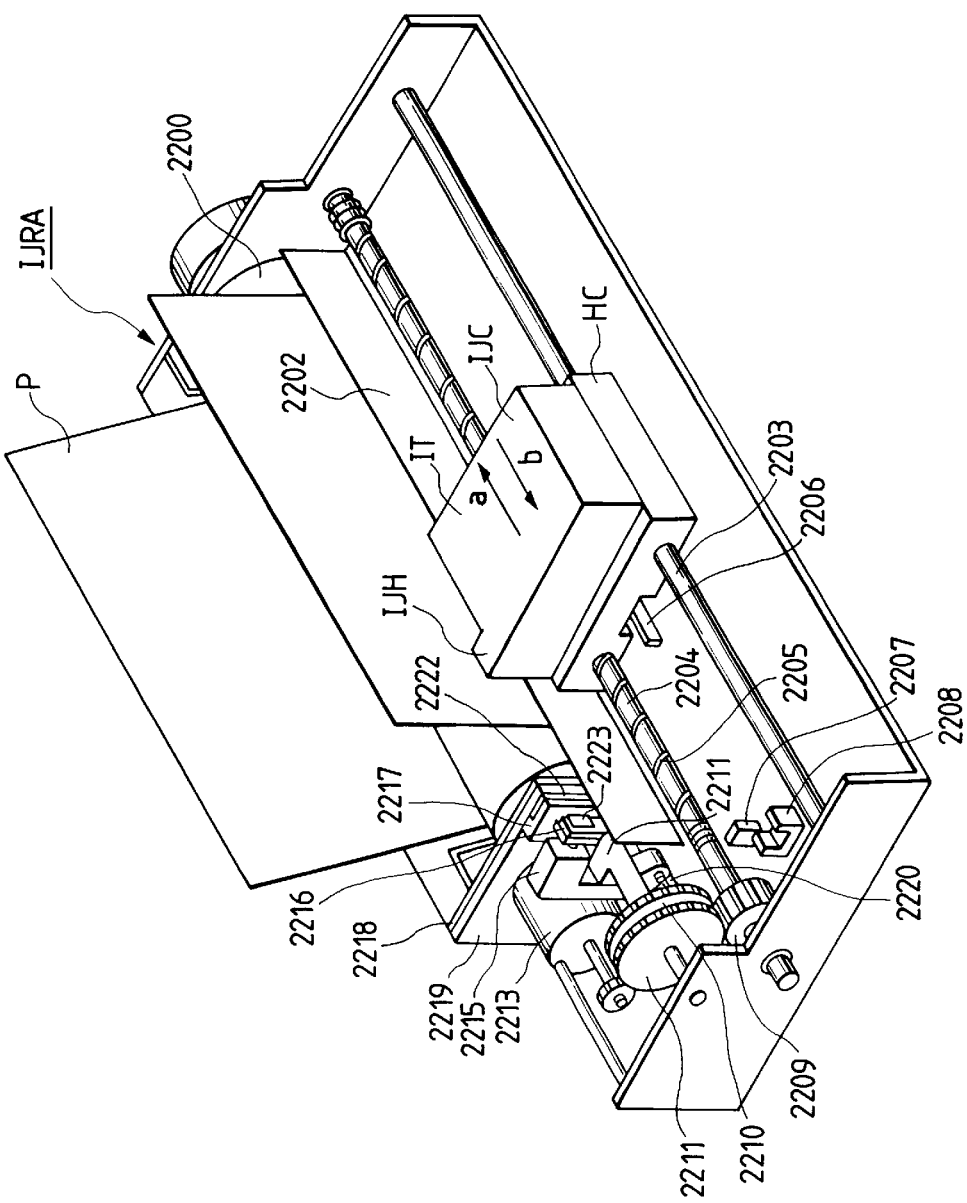
FIG. 32 shows the constitution of an ink jet outputting apparatus according to the present invention.

FIG. 32 is an external view showing the constitution of a second outputting apparatus according to the present invention, for example, an ink jet recording apparatus.

In the drawing, a carriage HC is engaged with a guide groove 2204 on a lead screw 2205 rotating through driving force transmitting gears 2211, 2209 interlocked with a forward/reverse rotation of a driving motor 2213. The carriage HC has a pin (not shown). The carriage HC is reciprocated in a direction shown by arrows a, b. An ink cartridge IJC is mounted on the carriage HC. A color ink jet cartridge CIJC having a color ink and a monochrome ink jet cartridge MIJC having a black ink alone are prepared for the mountable printer IJC. Numeral 2202 denotes a paper pressing plate. The plate 2202 presses the paper against a platen 2200 in a direction of carriage movement. Numerals 2207, 2208 denote home position detecting means for confirming a presence of a lever 2206 of the carriage by a photocoupler and for switching a direction of rotation of the motor 2213.

An auto sheet feeder capable of automatically feeding plural sheets of paper is also attached to the printer. When the paper which is now being printed, that is, the paper on the platen is about to be discharged, the auto sheet feeder guides the subsequent paper to a paper feeding insert of the printer. After a paper discharge, the printer detects the paper by a paper sensor of the paper feeding insert. The subsequent paper is then fed so that it may be set in the platen. A sensor for sensing the amount of the remaining paper is attached to a paper tray of the auto sheet feeder. When the amount of the paper set on the sheet feeder is reduced to the amount less than a predetermined amount, the sensor is activated in response to this reduction.

Numeral 2216 denotes a member for supporting a cap member 2222 with which a recording head is capped over. Numeral 2215 denotes sucking means for sucking in the cap. The sucking means 2215 restores a suction of the recording head through an in-cap opening 2223. Numeral 2217 denotes a cleaning blade. The cleaning blade 2217 can be forwardly/backwardly moved by a member 2219. Numeral 2218 denotes a body support plate for supporting the cleaning blade 2217 and the member 2219. Numeral 2212 denotes a lever for starting the suction of a suction restoration. The lever 2212 is moved with the movement of a cam 2220 engaged with the carriage. The driving force from the driving motor is moved/controlled by known transmitting means such as a clutch switch.

These capping, cleaning and suction restoration are constituted so that a desired processing may be performed in the corresponding position by an action of the lead screw 2205 when the carriage reaches to a region near a home position. A desired operation has only to be performed at known timing.

Figure 33:
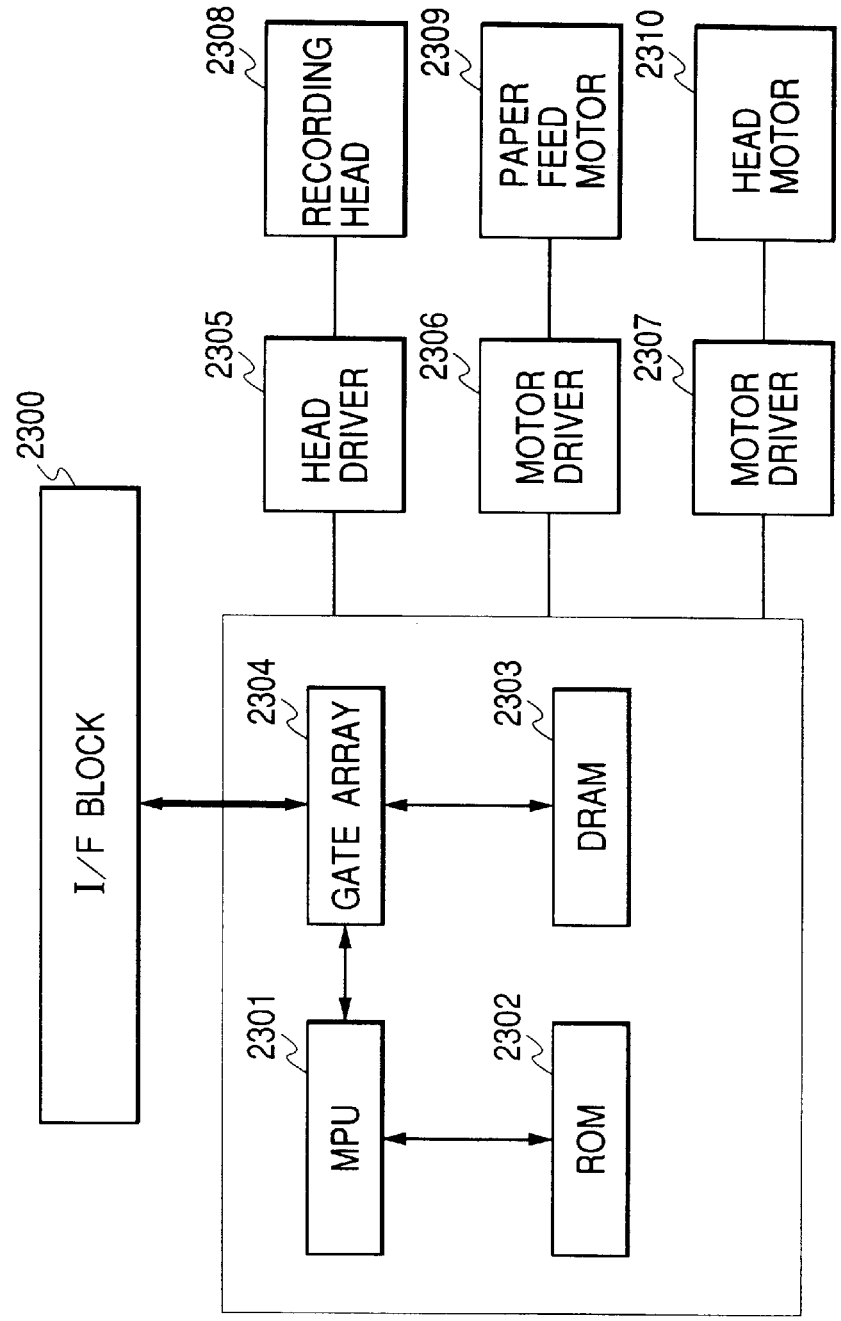
FIG. 33 is a block diagram showing the constitution of the ink jet outputting apparatus according to the present invention.

FIG. 33 is a block diagram showing a control constitution of the outputting apparatus shown in FIG. 32.

In the drawing, numeral 2300 denotes an interface section in which a recording signal of the host computer is input. Numeral 2301 denotes an MPU. Numeral 2302 denotes a ROM for storing the control program executed by the MPU 2301 and host print information therein. Numeral 2303 denotes a DRAM for retaining various data (the recording signal, recording data supplied to the head or the like) therein. Numeral 2304 denotes a gate array for controlling a supply of output data to a recording head 2308 and for controlling the data transmission among the interface 2300, the MPU 2301 and the DRAM 2303. Numeral 2310 denotes a carrier motor for carrying the recording head 2308. Numeral 2309 denotes a carrying motor for carrying the recording paper. Numeral 2305 denotes a head driver for driving the recording head. Numeral 2307 denotes a motor driver for driving the carrier motor 2310.

In the thus constituted recording apparatus, when input information is input from the host computer described below through the 1394 interface 2300, the input information is converted into print output information between the gate array 2304 and the MPU 2301. The motor drivers 2306, 2307 are driven. The recording head is also driven in accordance with the output information sent to the head driver 2305, whereby the print is operated.

Various information on the printer is accessible from the external apparatus through the 1394 interface 2300. As described above, the information includes the information on the type of the attached head IJC of the head attachable to the HC of the printer, the alarm about the amount of the remaining paper in the auto sheet feeder or the like. The access to the information will be described in the items "configuration ROM" and "status register" in "Configuration of printer-side 1394 serial bus interface" described below.

*Configuration of Printer-Side 1394 Serial Bus Interface

In the first outputting apparatus LBP and the second outputting apparatus ink jet printer according to the present invention, the apparatuses are connected to each other by the use of the IEEE1394 serial bus. In each apparatus, a block (hereinafter referred to as a 1394 I/F block) for the interface of this serial bus is the input section 18 in FIG. 31 in the LBP and the interface block 2300 in FIG. 33 in the ink jet printer.

The configuration of the 1394 I/F block will be described below. Since the basic configuration of the block is the same in both of the LBP and the ink jet printer, the present invention is applicable to both the printers. Portions inherent in each printer will be described on demand.

Figure 34:
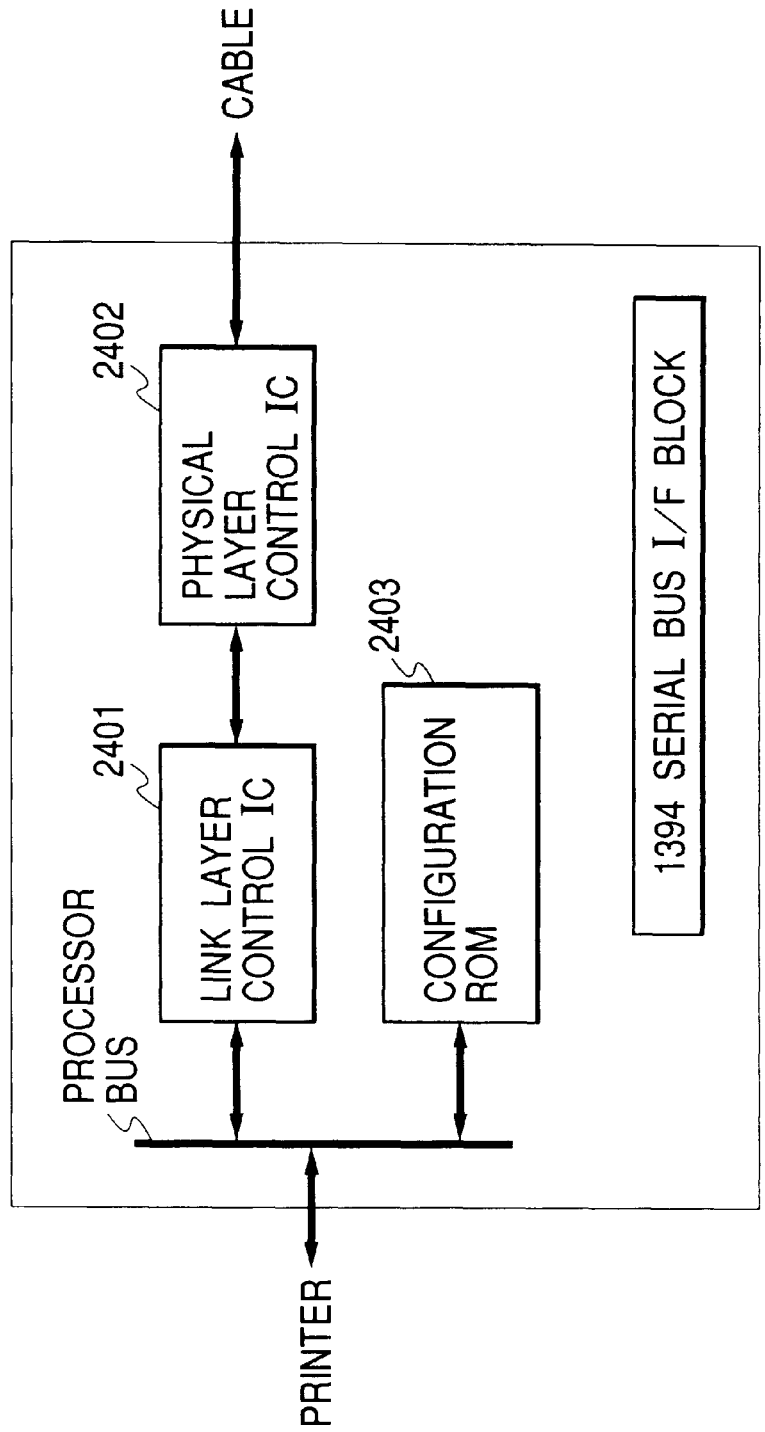
FIG. 34 is a block diagram showing a basic configuration of 1394 I/F according to the present invention.

FIG. 34 is a block diagram of the basic configuration of the 1394 I/F block.

In the drawing, numeral 2402 denotes a physical layer control IC for directly driving the 1394 serial bus. The physical layer control IC 2402 functions as the physical layer in "Summary of IEEE1394 technique" described above. The main function is the bus initialization/arbitration, an encode/decode of a transmission data code, a monitoring of whether the cable is turned on or off, the supply of the power for terminating a load (for recognizing an active connection) and the interface with a link layer IC.

Numeral 2401 denotes a link layer control IC for functioning as the interface with the printer body and for controlling the data transmission of the physical layer control IC 2402. The link layer control IC 2401 functions as the link layer in "Summary of IEEE1394 technique" described above. The main function of the IC is a transmission/reception FIFO for temporarily storing the data transmitted/received through the physical layer control IC 2402, a packeting of the transmission data, the determination of the physical layer control IC 2402 as to whether or not the received data is directed toward the node address or as to whether or not the isochronous transmission data is directed toward the allocated channel, a receiver for checking an error of the data and the interface with the printer body.

Figure 35B:
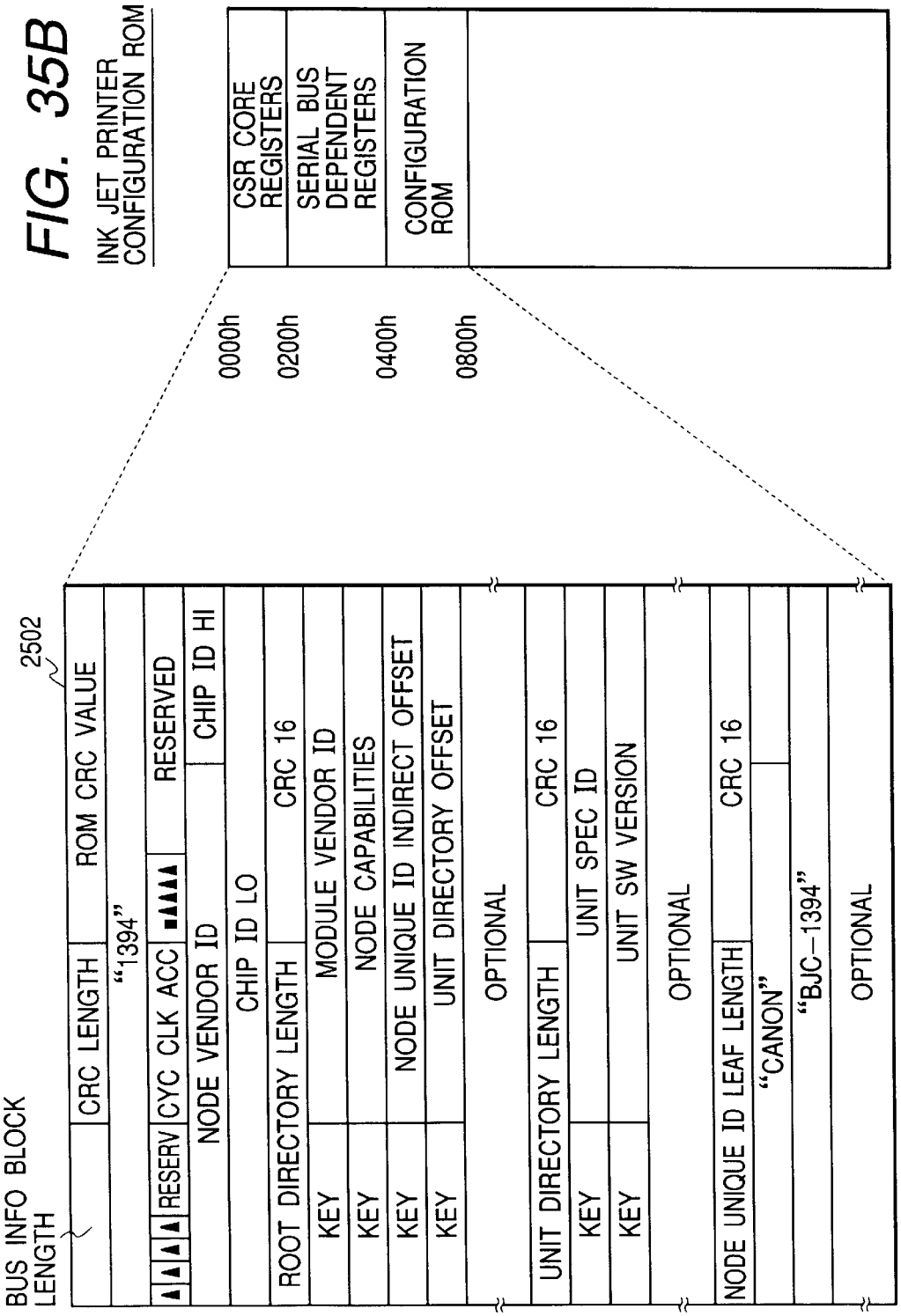

In the drawing, numeral 2403 denotes the configuration ROM for storing an identification inherent in each apparatus, communication conditions or the like therein. Although a data format of the ROM is based on the format defined by IEEE1394 standard, the data inherent in each apparatus is prepared so that it may be inherent in the LBP and the ink jet printer. FIG. 35A shows data 2501 stored in the configuration ROM of the LBP according to the present invention. FIG. 35B shows data 2502 stored in the configuration ROM of the ink jet printer according to the present invention.

Figure 36A:
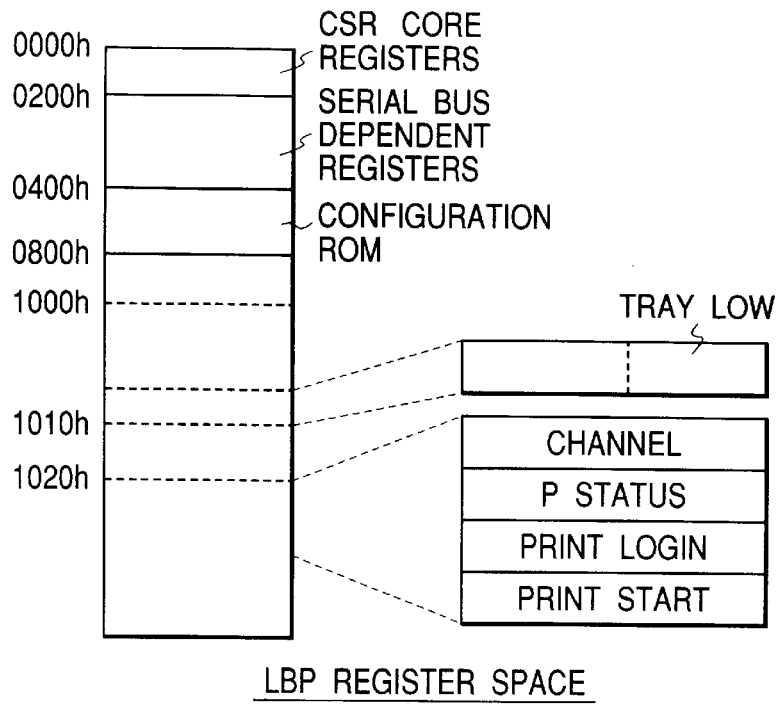
FIGS. 36A and 36B show the structure of the data stored in the configuration ROM according to the present invention.
Figure 36B:
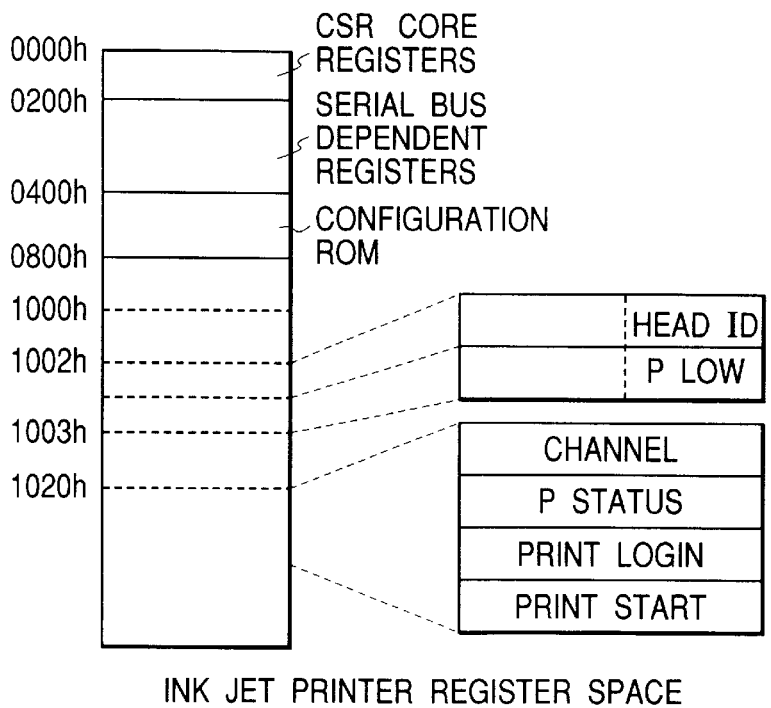

As described in "Summary of IEEE1394 technique", in an address setting of the 1394 serial bus, the last 28 bits are ensured as the area of the data inherent in each apparatus so that the area may be accessible from other devices connected to the serial bus. FIG. 36A shows this 28-bit-address space in the LBP according to the present invention. FIG. 36B shows this 28-bit address space in the ink jet printer according to the present invention. The configuration ROM is located in the area from an address 400 to an address 800 in the drawings.

The resister associated with the operation inherent in each printer body is located in the area of the address 800 and later. The resister is physically located in a control section of each printer, that is, in the gate array in the drawing in case of the ink jet printer and in the CPU in the drawing in case of the LBP.

Four registers starting from an address 1020 are provided as the register common to both the printers.

A channel register is the register for storing the allocated channel number at the time of the isochronous data transmission between the printer and the host. A P status resister is the register capable of detecting a basic operation status of the printer. A print login resister is the register for logging in to the printer by the host and for setting a login bit at the time of the access for ensuring the resource of the printer. A print start resister is the register in which the host sets the bit at the time of the start/completion of the print data transmission.

In case of the ink jet printer and the LBP according to the present invention, a status register group capable of monitoring the printer operation status or a control register group capable of controlling the operation status is located at an address 1000 and later. These register groups are partially shown in the drawings.

In case of the ink jet printer of this embodiment, for example, the information on the type of the attached recording head as the printer head is stored in a head ID resister at an address 1002 (in this embodiment, the color head CIJC is represented by 1 and the monochrome head is represented by 0). The current status of the printer operation is indicated at an address 1003. A bit 0 (P low) of the resister indicates the value of the sensor for sensing the amount of the remaining paper set in the auto sheet feeder. When the amount of the remaining paper in the auto sheet feeder is less than a preset amount, this value is set to 1.

In case of the LBP of this embodiment, for example, the current status of a paper cassette 1228 is indicated in an address 1010. The bit 0 (Tray low) of the resister indicates the value of the sensor for sensing the amount of the remaining paper set in the paper cassette. When the amount of the remaining paper is less than the preset amount, this value is set to 1.

Figure 37:
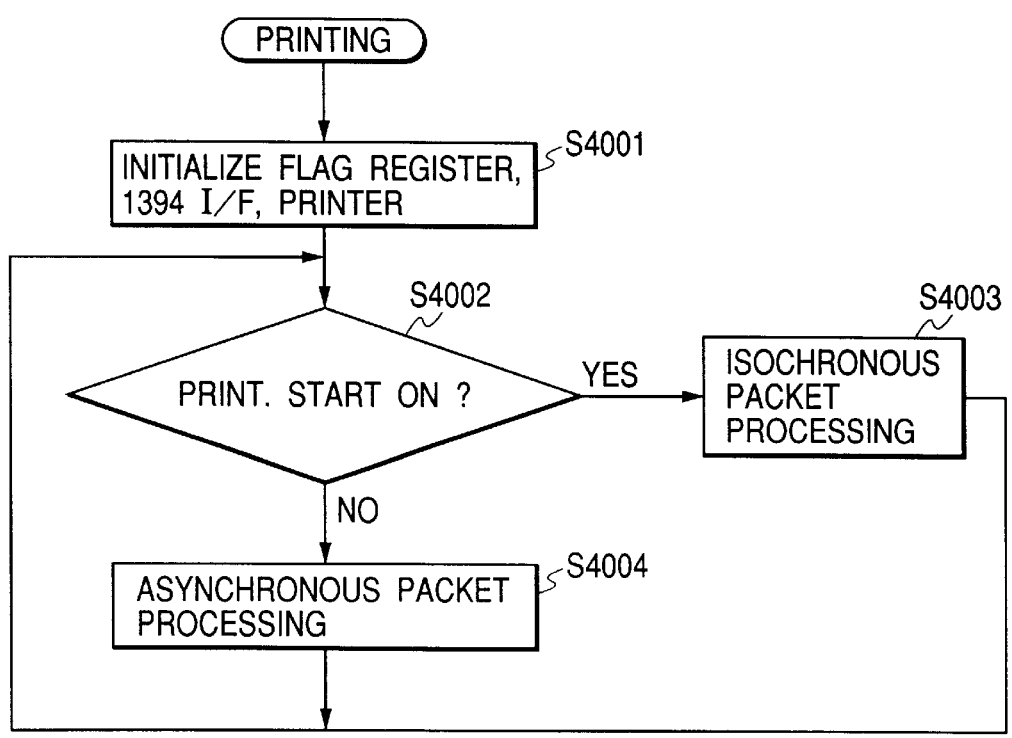
FIG. 37 is a flow chart showing a printing on a printer side according to the present invention.

A printing of the printer will be described in detail below with reference to a flow chart. FIG. 37 is a flow chart showing the printing. In step S4001, the initialization is performed. In this initializing step, a flag resister required for the print, the 1394 interface and the printer are initialized. Next, the processing proceeds to step S4002. In step S4002, whether or not the flag resister print. start indicating the print start is turned on is checked. The print. start flag register is turned on/off by an asynchronous command packet transmitted from the host PC. This flag register indicates whether or not print image data can be received. If print. start is turned on, the processing proceeds to step S4003. In step S4003, an isochronous packet processing is performed. The isochronous packet processing (ISO packet processing) is the processing for receiving the image data transmitted from the host PC as isochronous packet data through the 1394 interface. This processing will be described in detail with reference to FIG. 41. If print. start is not turned on in step S4002, the processing proceeds to step S4004. In step S4004, an asynchronous packet (ASYNC packet) processing is performed. The asynchronous packet processing is for setting the information on the printer and the 1394 interface by the packet data for the command transmitted from the host PC and for giving an instruction on the print start/completion. This processing will be described in detail with reference to FIG. 38.

Figure 38:
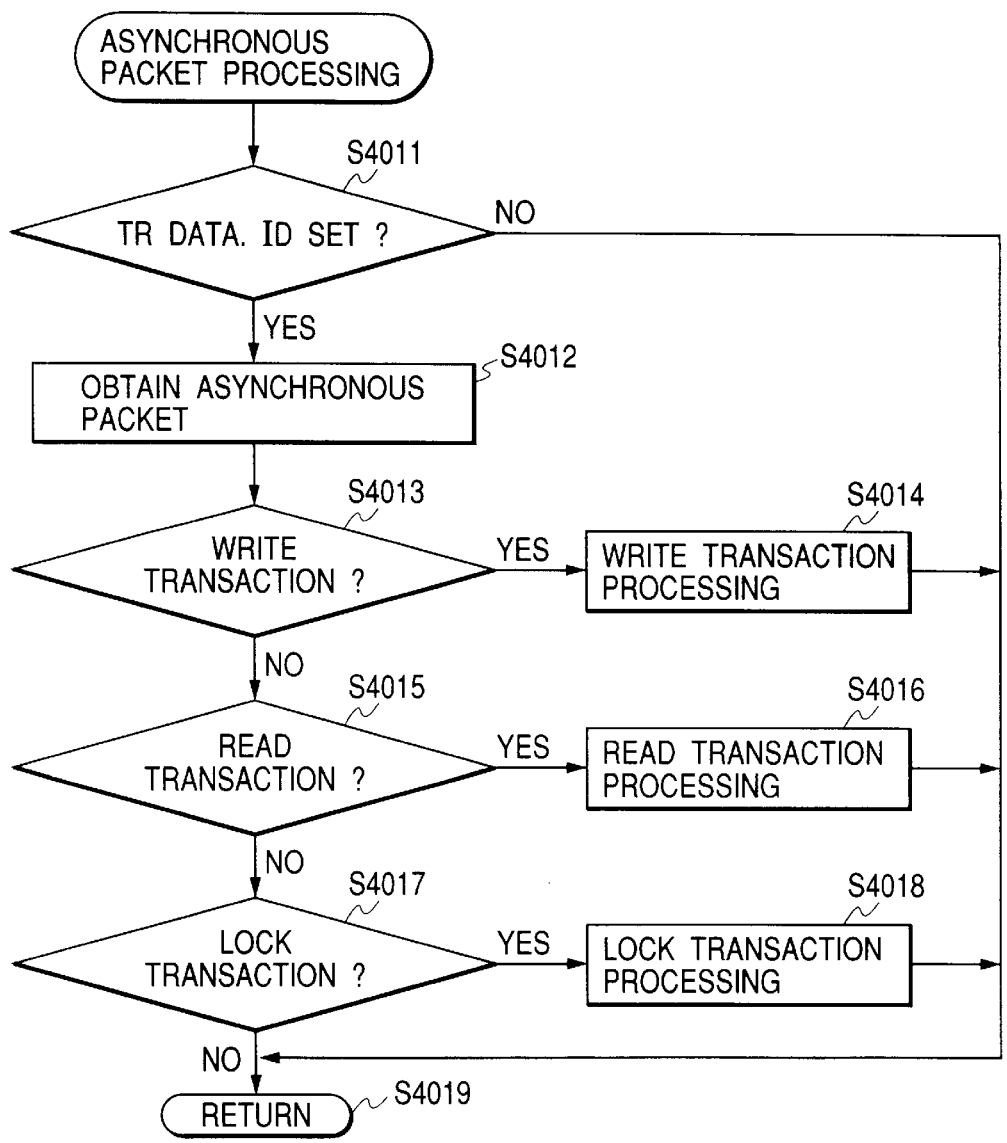
FIG. 38 is a flow chart showing an asynchronous packet processing according to the present invention.

FIG. 38 is a flow chart showing the ASYNC packet processing. This processing includes a write (write transaction) processing for setting the information from the host PC and for giving an instruction on the print start/completion; a read (read transaction) processing for reading printer setting information by the host; and a lock (lock transaction) processing for exchanging the data from the host PC. In the first place, in step S4011, whether or not TR DATA. indication is set is checked. TR DATA. indication indicates that the asynchronous packet is received by the transaction layer in the drawing showing the transaction layer. If the asynchronous packet is absent in step S4011, the processing proceeds to step S4019. The processing is followed by a return. This means that no processing is performed due to the absence of the asynchronous packet. If the asynchronous packet is present in step S4011, the processing proceeds to step S4012. In step S4012, the asynchronous packet is obtained from the transaction layer. The general form of the packet is shown in FIG. 24. Next, the processing proceeds to step S4013. Whether or not the packet indicates the write transaction is checked. Which transaction the packet indicates is set in tcode in the packet. This is shown in FIGS. 24 and 25. Whether or not the packet indicates the write transaction is determined in accordance with the value set in this tcode. If the packet indicates the write transaction, the processing proceeds to step S4014. In step S4014, the write transaction processing is performed. The write transaction processing is the processing for writing the information into the unit space of the printer. This processing will be described in detail with reference to FIG. 39. This step is followed by the return. If the packet does not indicate the write transaction in step S4013, the processing proceeds to step S4015. In step S4015, whether or not the packet indicates the read transaction is checked. This check is also accomplished in accordance with the value of the tcode in the asynchronous packet. If the packet indicates the read transaction, the processing proceeds to step S4016. In step S4016, the read transaction processing is performed. The read transaction processing is the processing for reading, by the host PC, the data addressed in accordance with the value set in the configuration ROM and the unit space of the printer. The data addressed by the host PC is sent as the response packet to the host. The read transaction will be described with reference to FIG. 40. This processing is followed by the return. If the packet does not indicate the read transaction in step S4015, the processing proceeds to step S4017. In step S4017, whether or not the packet indicates the lock transaction is checked. This check is also accomplished in accordance with the value of the tcode in the asynchronous packet. If the packet indicates the lock transaction, the processing proceeds to step S4018. In step S4018, the lock transaction processing is performed. The lock transaction is the processing for obtaining the data written from the host PC and the original data, for exchanging the written data for the original data if the original data value is correct and for setting the original data. This processing is followed by the return.

Figure 39:
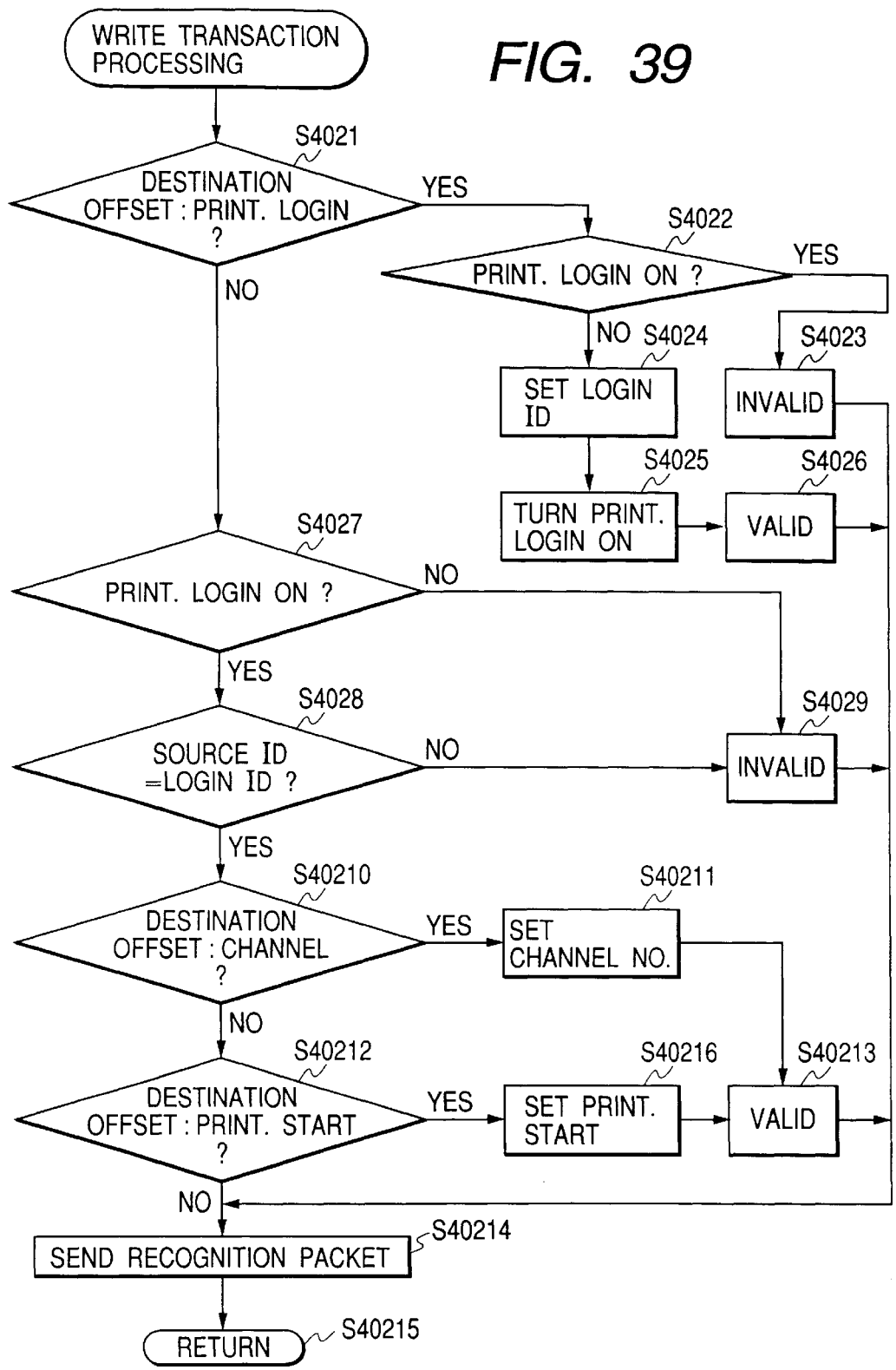
FIG. 39 is a flow chart showing a write transaction processing according to the present invention.

FIG. 39 is a flow chart showing the write transaction processing. FIG. 39 shows a write processing into the unit space of the printer. In step S4021, whether or not destination offset of the asynchronous packet indicates print. login is checked. The asynchronous packet is shown in FIG. 22. The address is set in destination offset. This address indicates a specific address of the unit space of the printer. This address allows contents designated by the host PC to be known. When the host PC instructs the printer to perform the print, print. login is performed as the first processing. Print. login is the declaration indicating that a certain host PC uses a specific printer. After the declaration, the printer that received the correct declaration responds to the command alone from the host that issued the declaration to the printer. This is accomplished in order that the printer does not receive the instructions from a plurality of hosts at the same time. If destination offset indicates print. login in step S4021, the processing proceeds to step S4022. In step S4022, whether or not print. login is already turned on is checked. If the login is already performed, this packet is invalid. Thus, the processing proceeds to step S4023. In step S4023, the packet is set to be invalid. Next, the processing proceeds to step S40214. In step S40214, an invalid recognition packet is sent. The processing is followed by the return. If print. login is not turned on in step S4022, the processing proceeds to step S4024. In step S4024, a login ID is set. The login ID is a host ID node number represented by destination ID of the asynchronous packet shown in FIG. 22. In the asynchronous packet processing after this step, the packet alone from the host PC having the ID equal to the login ID is processed. Next, the processing proceeds to step S4025. In step S4025, print. login is turned on. Since the correct login can be performed, the processing proceeds to step S4026. In step S4026, the packet is set to be valid. Next, the processing proceeds to step S40214. In step S40214, a valid recognition packet is sent. The processing is followed by the return. If destination offset does not indicate print. login in step S4021, the processing proceeds to step S4027. In step S4027, whether or not print. login is turned on is checked. If print. login is not turned on, this means the following fact. That is, although the login is not yet performed, the packet is sent from the host other than the logging-in host. Thus, the processing proceeds to step S4029. In step S4029, the packet is set to be invalid. Next, the processing proceeds to step S40214. In step S40214, the invalid recognition packet is sent. This step is followed by the return. If print. login is turned on in step S4027, the processing proceeds to step S4028. In step S4028, whether or not the login ID is equal to source ID of the packet shown in FIG. 22 is checked. If the login ID is not equal to source ID, this packet is the packet sent from the host other than the logging-in host. Thus, the packet is invalid. The processing proceeds to step S4029. In step S4029, the packet is set to be invalid. Next, the processing proceeds to step S40214. In step S40214, the invalid recognition packet is sent. This step is followed by the return. If the login ID is equal to source ID in step S4028, the processing proceeds to step S40210. In step S40210, whether or not destination offset indicates channel is checked. Channel is indicative of the channel number for use in the isochronous packet transmission. If destination offset indicates channel, the processing proceeds to step S40211. In step S40211, channel No. is set. Next, since the packet is valid, the processing proceeds to step S40213. In step S40213, the packet is set to be valid. Next, the processing proceeds to step S40214. In step S40214, the valid recognition packet is sent. This step is followed by the return. If destination offset does not indicate channel in step S40210, the processing proceeds to step S40212. In step S40212, whether or not destination offset indicates print. start is checked. If destination offset indicates print. start, the processing proceeds to step S40216. In step S40216, print. start is set. The processing proceeds to step S40213. In step S40213, the packet is set to be valid. Next, the processing proceeds to step S40214. In step S40214, the valid recognition packet is sent. This step is followed by the return.

Figure 40:
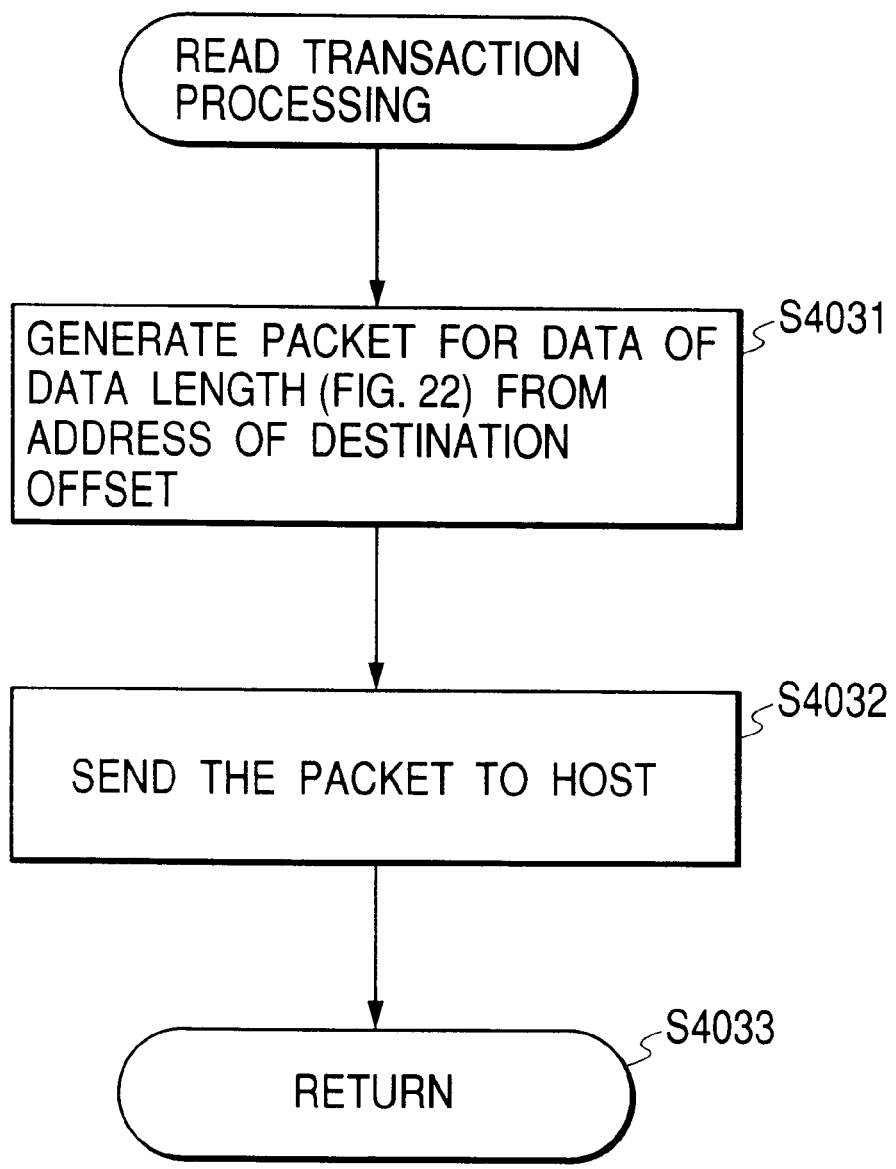
FIG. 40 is a flow chart showing a read transaction processing according to the present invention.

FIG. 40 is a flow chart showing the read transaction processing. First, in step S4031, generated is the packet in which the data of data length (FIG. 22) in size is set in the area of data field from the address of destination offset. The subsequently generated packet is sent to the addressed host.

The above description is provided for the processing of the asynchronous packet (ASYNC packet) with reference to FIGS. 38 through 40. The packet allows various setting processing to be executed during the reception of the image data.

Figure 41:
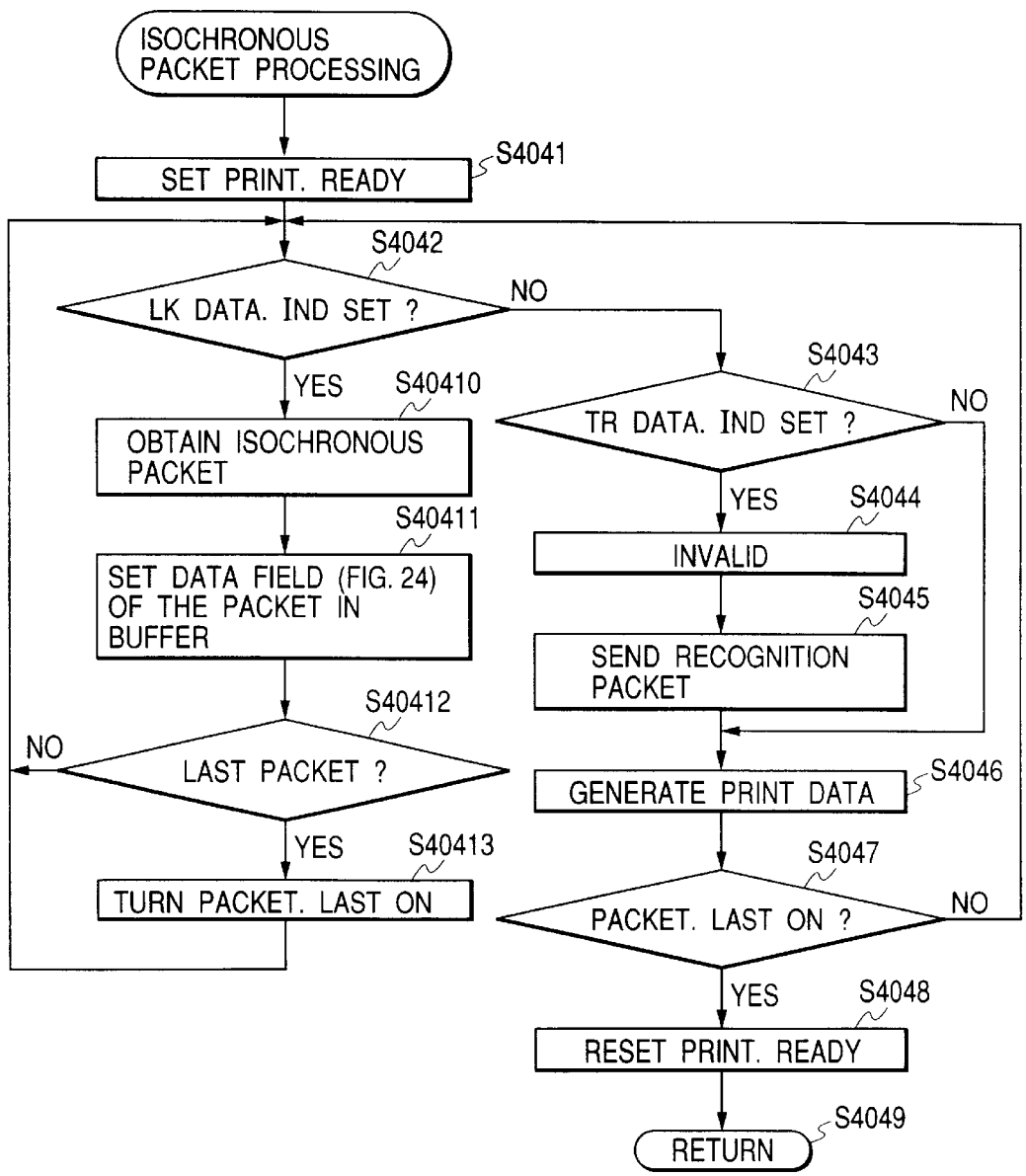
FIG. 41 is a flow chart showing an isochronous packet processing according to the present invention.

FIG. 41 is a flow chart showing in detail the isochronous packet (ISO packet) processing. The image data is received as the isochronous packet from the host PC, whereby the printing operation is performed. The ISO packet processing is performed after print. start is set. In step S4041, a print. ready flag is first set. The print. ready flag indicates that a preparation for the reception of the isochronous packet is completed. This flag thus indicates that the print can be performed. Next, the processing proceeds to step S4042. In step S4042, whether or not LK DATA. ind is set is checked. LK DATA. ind indicates whether or not the link layer shown in FIG. 27 receives the isochronous packet. When the isochronous packet is received, LK DATA. ind is set. If LK DATA. ind is not set in step S4042, the processing proceeds to step S4043. In step S4043, whether or not the asynchronous packet is received is checked. This check is performed by TR DATA. indication. During the isochronous packet processing, the asynchronous packet is not received. Thus, if TR DATA. indication is turned on, the processing proceeds to step S4044. In step S4044, the packet is set to be invalid. Next, the processing proceeds to step S4045. In step S4045, the invalid recognition packet is sent. Next, the processing proceeds to step S4046. In step S4046, the print data is generated. In case of the ink jet printer, the generation of the print data is performed so that the image data to be printed in one line may be loaded in the form of the head. In case of a page printer such as the LBP, the generation is performed so that the print data for one page may be loaded into a page memory. Next, the processing proceeds to step S4047. In step S4047, whether or not packet. last is turned on is checked. Packet. last is the flag indicating whether or not the packet is the last packet of the ISO packet sent from the host PC. If packet. last is not turned on, the processing is returned to step S4042. The processing is repeated. If packet. last is turned on in step S4047, the processing proceeds to step S4048. In step S4048, the print. ready flag is reset. This step is followed by the return. If LK DATA. ind is not set in step S4042, the processing proceeds to step S40410. In step S40410, the ISO packet is obtained. The isochronous packet is shown in FIG. 24. An image data field, data field (FIG. 24) of the ISO packet obtained in step S40410 is set in a buffer for temporarily storing the data field. The data stored in data field becomes the print image data. Next, the processing proceeds to step S40412. In step S40412, whether or not the packet is the last ISO packet is checked. This check is performed in accordance with the value set in sy of the isochronous packet (FIG. 24), whereby the check can be accomplished. The host PC sets sy of the last ISO packet to a value differing from sy's of other packets. If the packet is not the last packet in step S40412, the processing is returned to step S4042. The processing is repeated. If the packet is the last packet in step S40412, the processing proceeds to step S40413. In step S40413, packet. last is turned on. The processing is then returned to step S4042. The processing is repeated.

Figure 42:
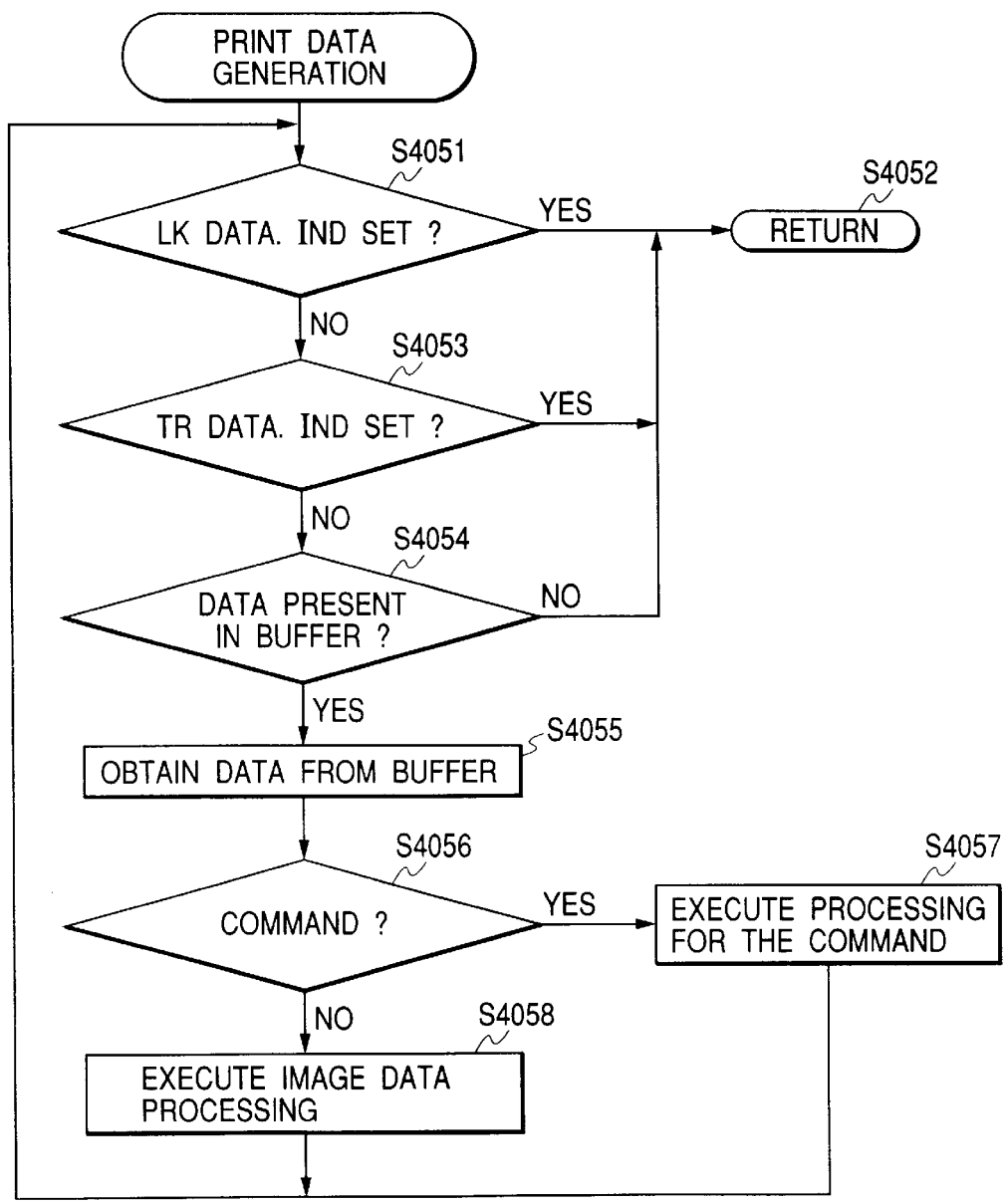
FIG. 42 is a flow chart showing a print data generation according to the present invention.

FIG. 42 is a flow chart of the print data generation. In the first place, in step S4051, whether or not LK DATA. ind is turned on is checked. If LK DATA. ind is turned on, the ISO packet is present. Thus, the print data generation is stopped. This step is then followed by the return. If LK DATA. ind is not turned on in step S4051, the processing proceeds to step S4053. In step S4053, whether or not TR DATA. indication is turned on is checked. If TR DATA. indication is turned on, the ASYNC packet is present. Thus, the print data generation is stopped. This step is then followed by the return. If TR DATA. indication is not turned on in step S4053, the processing proceeds to step S4054. In step S4054, whether or not the image data is present in the buffer is checked. If the data is absent, this step is followed by the return. If the data is present in step S4054, the processing proceeds to step S4055. In step S4055, the data is fetched from the buffer. The data fetched from the buffer comprises the image data and various data such as a line feed. In step S4056, whether or not the data indicates the command is determined. If the data indicates the command, the processing proceeds to step S4057. In step S4057, the processing for various commands is executed. Next, the processing is returned to step S4051. The processing is then repeated. If the data does not indicate the command in step S4056, the processing proceeds to step S4058. In step S4058, the image data processing is performed. The printable data is processed by the image data processing. Next, the processing proceeds to step S4051. The processing is repeated.

As described above, by the processing shown in FIGS. 41 and 42, the ISO packet sent from the host PC is processed and the image data and various commands are then processed, whereby the printing is executed.

The host recognizes the printer type and determines the data transmission bandwidth suitable for the printer performance, whereby the print data transmission can be performed by the use of the optimum transmission bandwidth.

What is claimed is:

1. An information processing apparatus comprising:
   a recognizing circuit adapted for recognizing at least one of a printer type of a printer, a data type of print data, and a print mode;
   a setting circuit adapted for setting a data transmission bandwidth according to the at least one of the printer type, the print data type, and the print mode recognized by said recognizing circuit;
   a reading circuit adapted for reading a currently assignable data transmission bandwidth;
   a discrimination circuit adapted for discriminating whether the data transmission bandwidth set by said setting circuit can be assigned, based on the currently assignable data transmission bandwidth read by said reading circuit; and
   an obtaining circuit adapted for obtaining the data transmission bandwidth set by said setting circuit if said discrimination circuit discriminates that the set data transmission bandwidth can be assigned.

2. An information processing apparatus according to claim 1, wherein the data transmission bandwidth is a bandwidth used in an isochronous transmission with an IEEE 1394 serial bus.

3. An information processing apparatus according to claim 1, wherein said recognizing circuit recognizes the printer type by getting information from the printer.

4. An information processing apparatus according to claim 1, further comprising:
   a channel control circuit adapted for determining or obtaining a channel number of sending print data; and
   a sending circuit adapted for sending print data to the printer using the data transmission bandwidth set by said setting circuit and the channel number determined or obtained by said channel control circuit.

5. An information processing method comprising the steps of:
   recognizing at least one of a printer type of a printer, a data type of print data, and a print mode;
   setting a data transmission bandwidth according to the at least one of the printer type, the print data type, and the print mode recognized in said recognizing step;
   reading a currently assignable data transmission bandwidth;
   discriminating whether the data transmission bandwidth set by said setting circuit can be assigned, based on the currently assignable data transmission bandwidth read in said reading step; and
   obtaining the data transmission bandwidth set in said setting step if it is discriminated in said discrimination step that the set data transmission bandwidth can be assigned.

6. A method according to claim 5, wherein the data transmission bandwidth is a bandwidth used in an isochronous transmission with an IEEE 1394 serial bus.

7. A method according to claim 5, wherein said recognizing step includes recognizing the printer type by getting information from the printer.

8. A method according to claim 5, further comprising the steps of:
   determining or obtaining a channel number of sending print data; and
   sending print data to the printer using the data transmission bandwidth set in said setting step and the channel number determined or obtained in said determining or obtaining step.

9. A computer-readable memory medium storing a computer program for executing an information processing method, the program comprising:
   program code for recognizing at least one of a printer type of a printer, a data type of print data, and a print mode;
   program code for setting a data transmission bandwidth according to the at least one of the printer type, the print data type, and the print mode recognized by said program code for recognizing;
   program code for reading a currently assignable data transmission bandwidth;
   program code for discriminating whether the data transmission bandwidth set by execution of said program code for setting can be assigned, based on the currently assignable data transmission bandwidth read by execution of said program code for reading; and
   program code for obtaining the data transmission bandwidth set by execution of said program code for setting if it is discriminated that the set data transmission bandwidth can be assigned.

10. A medium according to claim 9, wherein the data transmission bandwidth is a bandwidth used in an isochronous transmission with an IEEE 1394 serial bus.

11. A medium according to claim 9, wherein said program code for recognizing recognizes the printer type by getting information from the printer.

12. A medium according to claim 9, further comprising;
   program code for determining or obtaining a channel number of sending print data; and
   program code for sending print data to the printer using the data transmission bandwidth set by execution of said program code for setting and the channel number determined or obtained by execution of said program code for determining or obtaining.

13. A program product for executing an information processing method, said program product comprising:
   program code for recognizing at least one of a printer type of a printer, a data type of print data, and a print mode;
   program code for setting a data transmission bandwidth according to the at least one of the printer type, the print data type, and the print mode recognized by said program code for recognizing;

program code for reading a currently assignable data transmission bandwidth;

program code for discriminating whether the data transmission bandwidth set by execution of said program code for setting can be assigned, based on the currently assignable data transmission bandwidth read by execution of said program code for reading; and program code for obtaining the data transmission bandwidth set by execution of said program code for setting if it is discriminated that the set data transmission bandwidth can be assigned.

14. A program product according to claim 13, wherein the data transmission bandwidth is a bandwidth used in an isochronous transmission with an IEEE 1394 serial bus.

15. A program product according to claim 13, wherein, in execution of said program code for recognizing, the printer type is recognized by means of getting information from the printer.

16. A program product according to claim 13, further comprising:

program code for determining or obtaining a channel number of sending print data; and program code for sending print data to the printer using the data transmission bandwidth set by execution of said program code for setting and the channel number determined or obtained by execution of said program code for determining or obtaining.

17. An information processing system comprising:

a printer, a recognizing circuit adapted for recognizing at least one of a printer type of said printer, a data type of print data, and a print mode;

a setting circuit adapted for setting a data transmission bandwidth, according to at least one of the printer type, the print data type, and the print mode recognized by said recognizing circuit;

a reading circuit adapted for reading a currently assignable data transmission bandwidth;

a discrimination circuit adapted for discriminating whether the data transmission bandwidth set by said setting circuit can be assigned, based on the currently assignable data transmission bandwidth read by said reading circuit; and an obtaining circuit adapted for obtaining the data transmission bandwidth set by said setting circuit if said discrimination circuit discriminates that the set data transmission bandwidth can be assigned.

18. A system according to claim 17, wherein the data transmission bandwidth is a bandwidth used in an isochronous transmission with an IEEE 1394 serial bus.

19. A system according to claim 17, wherein said recognizing circuit recognizes the printer type by getting information from said printer.

20. A system according to claim 17, further comprising:

a channel control circuit adapted for determining or obtaining a channel number of sending print data; and a sending circuit adapted for sending print data to the printer using the data transmission bandwidth set by said setting circuit and the channel number determined or obtained by said channel control circuit.

21. An information processing apparatus according to claim 1, wherein said recognizing circuit recognizes the print mode taking settings of a driver of said printer into consideration.

22. An information processing apparatus according to claim 21, wherein the settings of the driver of said printer include a draft mode and a fine mode.

23. A method according to claim 5, wherein said recognizing step includes recognizing the print mode taking settings of a driver of the printer into consideration.

24. A method according to claim 23, wherein the settings of the driver of the printer include a draft mode and a fine mode.

25. A medium according to claim 9, wherein said program code for recognizing the print mode, effects recognition taking settings of a driver of the printer into consideration.

26. A medium according to claim 25, wherein the settings of the driver of the printer include a draft mode and a fine mode.

27. A program product according to claim 13, wherein said program code for recognizing the print mode, effects recognition taking settings of a driver of the printer into consideration.

28. A program product according to claim 27, wherein the settings of the driver of the printer include a draft mode and a fine mode.

29. A system according to claim 17, wherein said recognizing circuit recognizes the print mode taking settings of a driver of said printer into consideration.

30. A system according to claim 29, wherein the settings of the driver of said printer include a draft mode and a fine mode.

31. An information processing apparatus comprising:

a recognizing circuit adapted for recognizing a processing ability of a data processing apparatus or a type of the data processing apparatus;

a setting circuit adapted for setting a data transmission bandwidth, according to the processing ability or the type of the data processing apparatus recognized by said recognizing circuit;

a reading circuit adapted for reading a currently assignable data transmission bandwidth;

a discrimination circuit adapted for discriminating whether the data transmission bandwidth set by said setting circuit can be assigned, based on the currently assignable data transmission bandwidth read by said reading circuit; and an obtaining circuit adapted for obtaining the data transmission bandwidth set by said setting circuit if said discrimination circuit discriminates that the set data transmission bandwidth can be assigned.

32. An information processing apparatus, comprising:

a recognition circuit adapted for recognizing a printer type of a printer, a print mode, a data type of print data or a processing ability of the printer;

a setting circuit adapted for setting a data transmission bandwidth according to the printer type and the print mode, the print data type or the processing ability recognized by said mode recognition circuit;

a reading circuit adapted for reading a currently assignable data transmission bandwidth;

a discrimination circuit adapted for discriminating whether the data transmission bandwidth set by said setting circuit can be assigned, based on the currently assignable data transmission bandwidth read by said reading circuit; and a sending circuit adapted for sending print data to the printer using the data transmission bandwidth set by said setting circuit if said discrimination circuit discriminates that the set data transmission bandwidth can be assigned.

33. An information processing method comprising the steps of:
  recognizing a processing ability of a data processing apparatus or a type of the data processing apparatus;
  setting a data transmission bandwidth, according to the processing ability or the type of the data processing apparatus recognized in said recognizing step;
  reading a currently assignable data transmission bandwidth;
  discriminating whether the data transmission bandwidth set in said setting step can be assigned, based on the currently assignable data transmission bandwidth read in said reading step; and
  obtaining the data transmission bandwidth set in said setting step if it is discriminated in said discrimination step that the set data transmission bandwidth can be assigned.

34. An information processing method, comprising;
  a recognition step, of recognizing a printer type of a printer, a print mode, a data type of print data or a processing ability of the printer;
  a setting step, of setting a data transmission bandwidth, according to the printer type, the print recognized mode, the print data type or the processing ability;
  a reading step, of reading a currently assignable data transmission bandwidth;
  a discriminating step, of discriminating whether the data transmission bandwidth set in said setting step can be assigned, based on the currently assignable data transmission bandwidth read in said reading step; and
  a sending step, of sending print data to the printer using the data transmission bandwidth set in said setting step if it is discriminated in said discrimination step that the set data transmission bandwidth can be assigned.

35. An information processing medium storing a program, wherein the program comprises:
  program code for recognizing a processing ability of a data processing apparatus or a type of the data processing apparatus;
  program code for setting a data transmission bandwidth, according to the processing ability or the type of the data processing apparatus recognized by execution of said program code for recognizing;
  program code for reading a currently assignable data transmission bandwidth;
  program code for discriminating whether the data transmission bandwidth set by execution of said program code for setting can be assigned, based on the currently assignable data transmission bandwidth read by execution of said program code for reading; and
  program code for obtaining the data transmission bandwidth set by execution of said program code for setting if it is discriminated that the set data transmission bandwidth can be assigned.

36. An information processing medium, comprising:
  program code for recognizing a printer type of a printer, a print mode, a data type of print data or a processing ability of the printer;
  program code for setting a data transmission bandwidth according to the printer type, the print recognized mode, the print data type or the processing ability;
  program code for reading a currently assignable data transmission bandwidth;
  program code for discriminating whether the data transmission bandwidth set by execution of said program code for setting can be assigned, based on the currently assignable data transmission bandwidth read by execution of said program code for reading; and
  program code for sending print data to the printer using the data transmission bandwidth set by execution of said program code for setting if it is discriminated that the set data transmission bandwidth can be assigned.

37. An information processing program comprising:
  program code for recognizing a processing ability of a data processing apparatus or a type of the data processing apparatus;
  program code for setting a data transmission bandwidth, according to the processing ability or the type of the data processing apparatus recognized by execution of said program code for recognizing;
  program code for reading a currently assignable data transmission bandwidth;
  program code for discriminating whether the data transmission bandwidth set by execution of said program code for setting can be assigned, based on the currently assignable data transmission bandwidth read by execution of said program code for reading; and
  program code for obtaining the data transmission bandwidth set by execution of said program code for setting if it is discriminated that the set data transmission bandwidth can be assigned.

38. An information processing program product composing:
  program code for recognizing a printer type of a printer, a print mode, a data type of print data or a processing ability of the printer;
  program code for setting a data transmission bandwidth, according to the printer type, the print recognized mode, the print data type or the processing ability;
  program code for reading a currently assignable data transmission bandwidth;
  program code for discriminating whether the data transmission bandwidth set by execution of said program code for setting can be assigned, based on the currently assignable data transmission bandwidth read by execution of said program code for reading; and
  program code for sending print data to the printer using the data transmission bandwidth set by execution of said program code for setting if it is discriminated that the set data transmission bandwidth can be assigned.

39. An information processing system comprising:
  a recognizing circuit adapted for recognizing a processing ability of a data processing apparatus or a type of the data processing apparatus;
  a setting circuit adapted for setting a data transmission bandwidth, according to the processing ability or the type of the data processing apparatus recognized by said recognizing circuit;
  a reading circuit adapted for reading a currently assignable data transmission bandwidth;
  a discrimination circuit adapted for discriminating whether the data transmission bandwidth set by said setting circuit can be assigned, based on the currently assignable data transmission bandwidth read by said reading circuit; and
  an obtaining circuit adapted for obtaining the data transmission bandwidth set by said setting circuit if said discrimination circuit discriminates that the set data transmission bandwidth can be assigned.

40. An information processing system, comprising:

a recognition circuit adapted for recognizing a printer type of a printer, a print mode, a data type of print data or a processing ability of the printer, a setting circuit adapted for setting a data transmission bandwidth according to the printer type and the print mode, the print data type or the processing ability recognized by said mode recognition circuit;

a reading circuit adapted for reading a currently assignable data transmission bandwidth;

a discrimination circuit adapted for discriminating whether the data transmission bandwidth set by said setting circuit can be assigned, based on the currently assignable data transmission bandwidth read by said reading circuit; and a sending circuit adapted for sending print data to the printer using the data transmission bandwidth set by said setting circuit if said discrimination circuit discriminates that the set data transmission bandwidth can be assigned.

* * * * *

UNITED STATES PATENT AND TRADEMARK OFFICE
CERTIFICATE OF CORRECTION

PATENT NO.     : 6,775,020 B2
DATED          : August 10, 2004
INVENTOR(S)    : Koji Fukunaga et al.

It is certified that error appears in the above-identified patent and that said Letters Patent is hereby corrected as shown below:

<u>Title page,</u>
Item [*] Notice, delete the phrase "by 0 days" and insert -- by 39 days --

<u>Drawings,</u>
Sheet 12, FIG. 12, "MAINT" (both occurrences) should read -- MAIN --.
Sheet 14, FIG. 14, "VENDER" (all occurrences) should read -- VENDOR --.

<u>Column 2,</u>
Line 66, "resister" should read -- register --.

<u>Column 3,</u>
Line 1, "resister" should read -- register --.

<u>Column 4,</u>
Line 42, "Id's" should read -- ID's --.

<u>Column 5,</u>
Lines 58 and 64, "resister" should read -- register --;
Lines 60 and 62, "resister" (both occurrences) should read --register--.

<u>Column 6,</u>
Lines 2 and 8, "resister" should read -- register --;
Line 6, "comprises" should read -- comprise --;
Line 15, "cross sectional" should read -- cross-sectional --;
Line 20, "allow" should read -- allows --; and
Line 22, "trouble" should read -- problem --.

<u>Column 7,</u>
Line 23, "operation" should read -- operations --.

<u>Column 11,</u>
Lines 2 and 8, "resister" should read -- register --; and
Lines 5, 10 and 13, "resisters" should read -- registers --.

<u>Column 13,</u>
Line 16, "flow" should read -- flows --;
Line 19, "be" should read -- be in --; and
Line 43, "request" should read -- requests --

UNITED STATES PATENT AND TRADEMARK OFFICE
CERTIFICATE OF CORRECTION

PATENT NO. : 6,775,020 B2
DATED : August 10, 2004
INVENTOR(S) : Koji Fukunaga et al.

It is certified that error appears in the above-identified patent and that said Letters Patent is hereby corrected as shown below:

Column 14,
Line 31, "to" should be deleted.

Column 16,
Line 47, "to" should be deleted.

Column 17,
Line 64, "resister" should read -- register --; and
Line 67, "resister" (both occurrences) should read -- register --.

Column 18,
Line 3, "resister," should read -- register, --; and
Line 23, "resister" should read -- register --.

Column 19,
Lines 9, 14 and 21, "resister" should read -- register --;
Line 24, "cross sectional" should read -- cross-sectional --; and
Line 60, "slot" should read -- slots --.

Column 20,
Line 36, "memory is" should read -- memories are --.

Column 22,
Lines 59 and 61, "resister" should read -- register --.

Column 23,
Lines 3, 5, 8, 19, 23, 30, 38 and 41, "resister" should read --register--.

Column 25,
Line 66, "processing" should read -- processings --.

Column 28,
Line 4, "by" should read -- in --; "circuit" should read -- step --; and
Line 42, "selling" should read -- setting --.

Column 29,
Line 28, "printer," should read -- printer; --.

Column 30,
Line 52, "type and" should read -- type, --.

UNITED STATES PATENT AND TRADEMARK OFFICE
CERTIFICATE OF CORRECTION

PATENT NO. : 6,775,020 B2
DATED : August 10, 2004
INVENTOR(S) : Koji Fukunaga et al.

It is certified that error appears in the above-identified patent and that said Letters Patent is hereby corrected as shown below:

Column 31,
Line 23, "comprising;" should read -- comprising: --; "recognized" should be Deleted; and
Line 61, "recognized" should be deleted.

Column 32,
Line 29, "compos-" should read -- compris- --; and
Line 36, "recognized" should be deleted.

Column 33,
Line 6, "printer," should read -- printer; --; and
Line 8, "type and" should read -- type, --.

Signed and Sealed this

Twenty-sixth Day of April, 2005

JON W. DUDAS
*Director of the United States Patent and Trademark Office*